(12) United States Patent
Bacivarov et al.

(10) Patent No.: US 10,810,409 B2
(45) Date of Patent: *Oct. 20, 2020

(54) IDENTIFYING FACIAL EXPRESSIONS IN ACQUIRED DIGITAL IMAGES

(71) Applicant: FotoNation Limited, Galway (IE)

(72) Inventors: Ioana Bacivarov, Galway (IE); Peter Corcoran, Claregalway (IE)

(73) Assignee: FotoNation Limited, Galway (IE)

( * ) Notice: Subject to any disclaimer, the term of this patent is extended or adjusted under 35 U.S.C. 154(b) by 0 days.

This patent is subject to a terminal disclaimer.

(21) Appl. No.: 15/811,177

(22) Filed: Nov. 13, 2017

(65) Prior Publication Data

US 2018/0129870 A1 May 10, 2018

Related U.S. Application Data

(60) Continuation of application No. 14/680,977, filed on Apr. 7, 2015, now Pat. No. 9,818,024, which is a division of application No. 13/942,442, filed on Jul. 15, 2013, now abandoned, which is a continuation of (Continued)

(51) Int. Cl.
*G06K 9/00* (2006.01)
*G06K 9/52* (2006.01)
*G06T 7/40* (2017.01)
*H04N 5/232* (2006.01)

(52) U.S. Cl.
CPC ..... *G06K 9/00302* (2013.01); *G06K 9/00281* (2013.01); *G06K 9/00288* (2013.01); *G06K 9/00308* (2013.01); *G06K 9/52* (2013.01); *G06T 7/40* (2013.01); *H04N 5/23219* (2013.01)

(58) Field of Classification Search
None
See application file for complete search history.

(56) References Cited

U.S. PATENT DOCUMENTS

| 2008/0001951 A1* | 1/2008 | Marks | A63F 13/06 345/474 |
| 2008/0260212 A1* | 10/2008 | Moskal | A61B 5/1079 382/118 |
| 2010/0194863 A1* | 8/2010 | Lopes | G06T 19/00 348/50 |

OTHER PUBLICATIONS

De Silva, P. Ravindra, et al. "Towards recognizing emotion with affective dimensions through body gestures." Automatic Face and Gesture Recognition, 2006. FGR 2006. 7th International Conference on. IEEE, 2006.*

(Continued)

*Primary Examiner* — Vu Le
*Assistant Examiner* — Tracy Mangialaschi
(74) *Attorney, Agent, or Firm* — Accel IP Law Firm

(57) ABSTRACT

A face is detected and identified within an acquired digital image. One or more features of the face is/are extracted from the digital image, including two independent eyes or subsets of features of each of the two eyes, or lips or partial lips or one or more other mouth features and one or both eyes, or both. A model including multiple shape parameters is applied to the two independent eyes or subsets of features of each of the two eyes, and/or to the lips or partial lips or one or more other mouth features and one or both eyes. One or more similarities between the one or more features of the face and a library of reference feature sets is/are determined. A probable facial expression is identified based on the determining of the one or more similarities.

18 Claims, 12 Drawing Sheets

Related U.S. Application Data application No. 12/784,418, filed on May 20, 2010, now Pat. No. 8,488,023.

(60) Provisional application No. 61/221,417, filed on Jun. 29, 2009, provisional application No. 61/221,425, filed on Jun. 29, 2009, provisional application No. 61/179,808, filed on May 20, 2009.

(56) References Cited

OTHER PUBLICATIONS

Sattar A, Stoiber N, Seguier R, Breton G. Gamer's facial cloning for online interactive games. International Journal of Computer Games Technology. Jan. 1, 2009;2009:9. (Year: 2009).*

Zhou, Xiaoxu, Xiangsheng Huang, and Yangsheng Wang. "Real-time facial expression recognition in the interactive game based on embedded hidden markov model." Computer Graphics, Imaging and Visualization, 2004. CGIV 2004. Proceedings. International Conference on. IEEE, 2004. (Year: 2004).*

Martin, Olivier. Mixed reality interactive storytelling: acting with gestures and facial expressions/. Doctoral dissertation, Catholic University of Louvain, Louvain-la-Neuve, Belgium, 2007. (Year: 2007).*

Liebelt, Joerg, Jing Xiao, and Jie Yang. "Robust AAM fitting by fusion of images and disparity data." 2006 IEEE Computer Society Conference on Computer Vision and Pattern Recognition (CVPR'06). vol. 2. IEEE, 2006. (Year: 2006).*

Zalewski, Lukasz, and Shaogang Gong. "2d statistical models of facial expressions for realistic 3d avatar animation." 2005 IEEE Computer Society Conference on Computer Vision and Pattern Recognition (CVPR'05). vol. 2. IEEE, 2005. (Year: 2005).*

Cheon, Yeongjae, and Daijin Kim. "A natural facial expression recognition using differential-AAM and k-NNS." 2008 Tenth IEEE International Symposium on Multimedia. IEEE, 2008. (Year: 2008).*

Zhan, Ce, et al. "A real-time facial expression recognition system for online games." International Journal of Computer Games Technology 2008 (2008). (Year: 2008).*

* cited by examiner

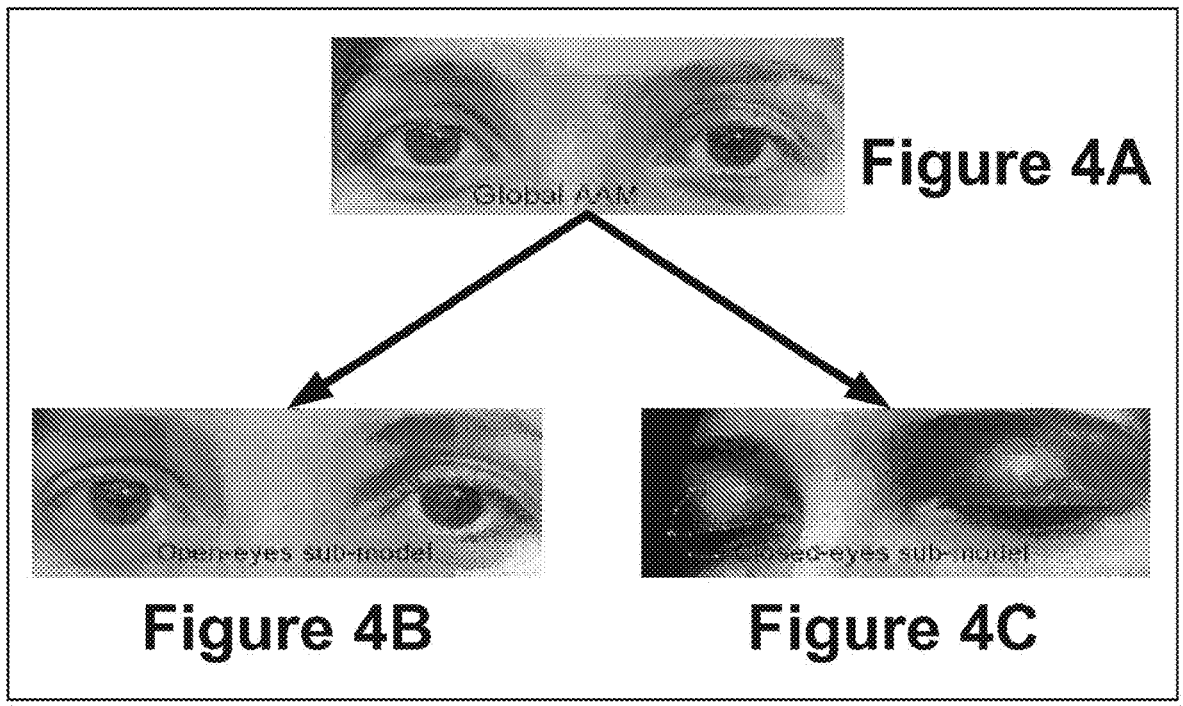
Figure 4A
Figure 4B    Figure 4C
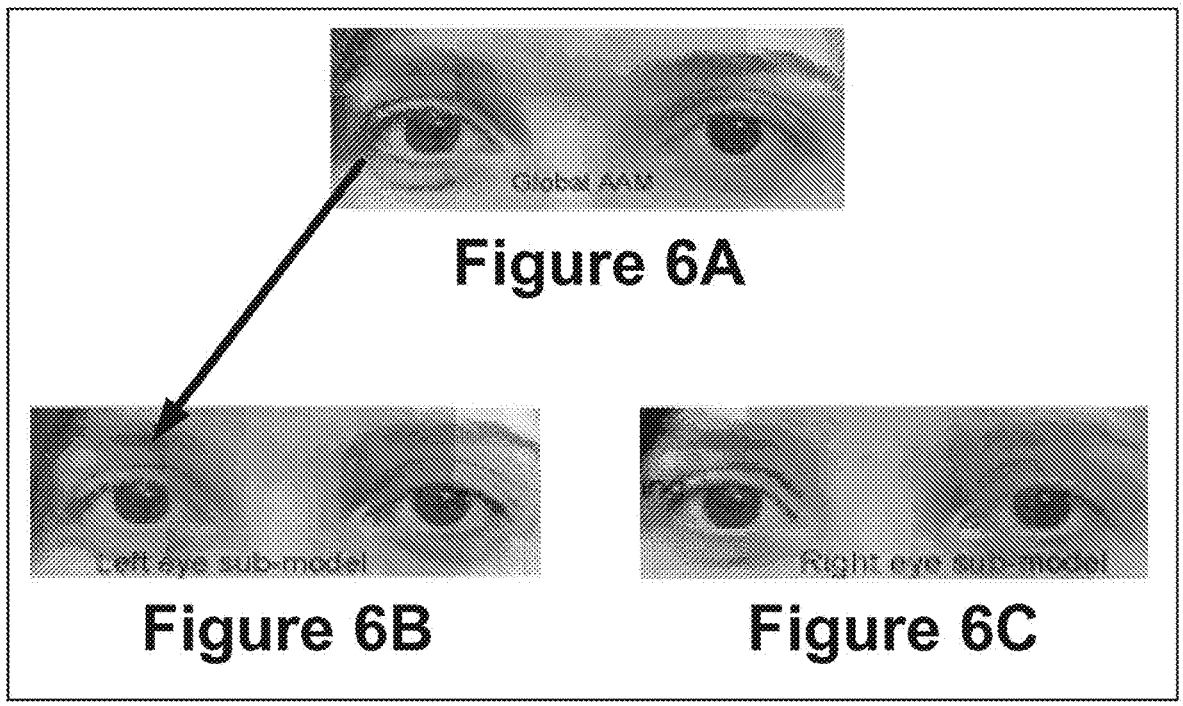
Figure 6A
Figure 6B    Figure 6C

  
Figure 7A　　Figure 7B　　Figure 7C
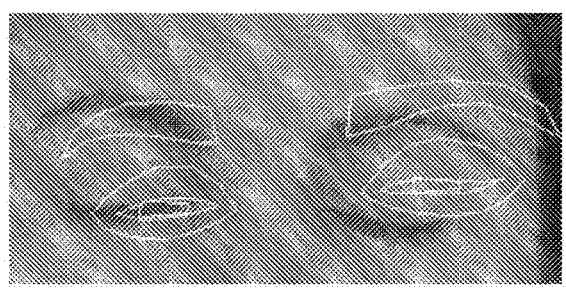 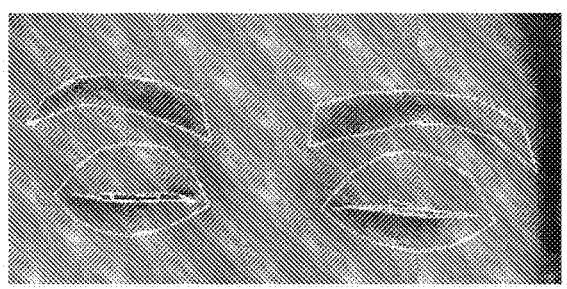
Figure 9A　　Figure 9B

  
Figure 14A  Figure 14B  Figure 14C
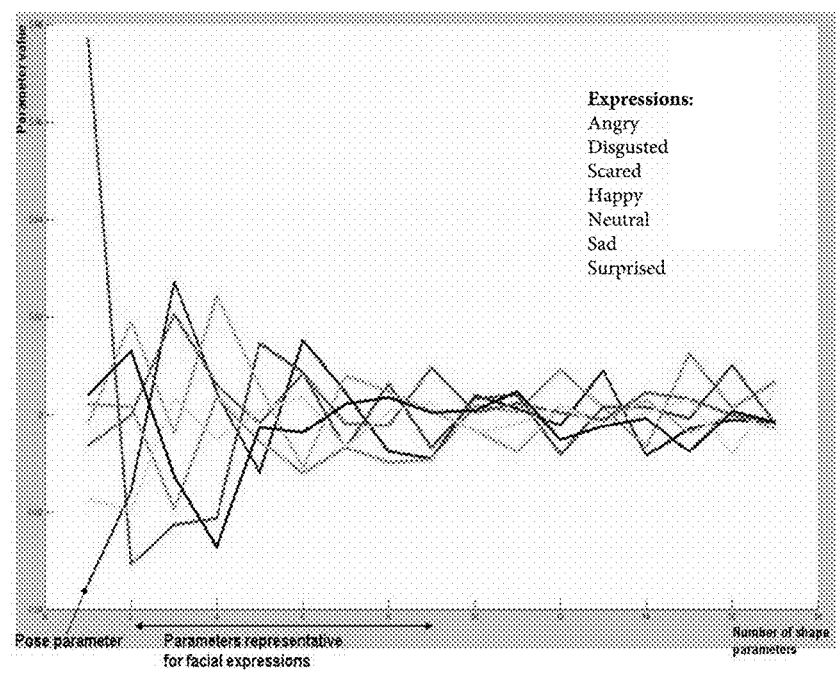
Figure 15
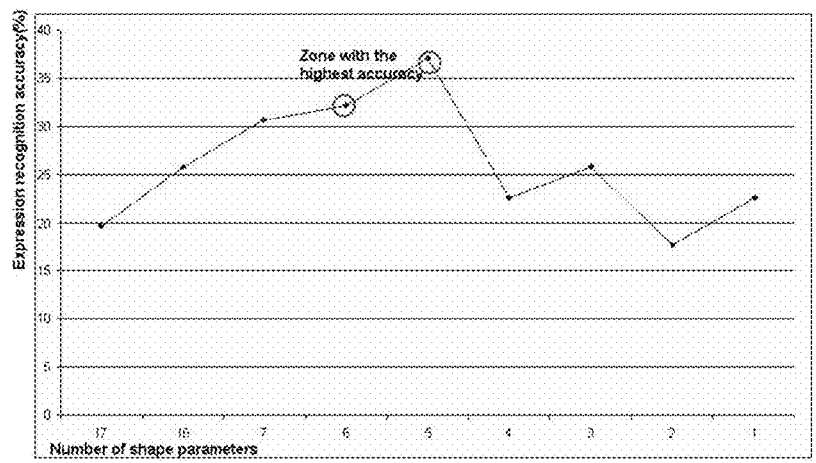
Figure 16

IDENTIFYING FACIAL EXPRESSIONS IN ACQUIRED DIGITAL IMAGES

PRIORITY AND RELATED APPLICATIONS

This application claims the benefit under 35 U.S.C. § 121 as a continuation of U.S. application Ser. No. 14/680,977, filed Apr. 7, 2015, which is a divisional of U.S. application Ser. No. 13/942,442, filed Jul. 15, 2013, which is a continuation of U.S. Pat. No. 8,488,023 issued Jul. 16, 2013, which claims the benefit of priority to provisional application 61/179,808, filed May 20, 2009, provisional application 61/221,417, filed Jun. 29, 2009, and provisional application 61/221,425, filed Jun. 29, 2009, the entire contents of which are hereby incorporated by reference for all purposes as if fully set forth herein. The applicants hereby rescind any disclaimer of claim scope in the parent applications or the prosecution history thereof and advise the USPTO that the claims in this application may be broader than any claim in the parent applications.

This application is related to U.S. published application 2008/0205712, published application 2009/0003661, U.S. Pat. Nos. 7,715,597, 7,515,740, and U.S. published application 2008/0013798. Each of the above patents and patent applications is incorporated by reference.

BACKGROUND

In the recent past, a digital camera was only able to capture images. Recently, however, face-tracking technology has become a common feature of consumer digital cameras, e.g., U.S. Pat. Nos. 7,403,643, 7,460,695, 7,315,631 and U.S. application Ser. Nos. 12/063,089 and 12/479,593 are incorporated by reference. The most recent implementations feature hardware coded face tracking in an IP-core. Applications to date have been limited to optimizing the exposure and acquisition parameters of a final image. Yet there are many additional applications which have even greater potential to enrich the user experience. The rapid deployment of face tracking technology in cameras suggests that other more advanced face analysis techniques will soon become feasible and begin to offer even more sophisticated capabilities in such consumer devices.

The detailed analysis of facial expression is one such technique which can offer a wide range of new consumer applications for mobile and embedded devices. In the context of managing our personal image collections, it is useful to be able to sort images according to the people in those images. It would be even more useful if it were possible to determine their emotions and thus enable images to be further sorted and categorized according to the emotions of the subjects in an image.

Other consumer device applications also can gain from such capabilities. Many such devices now feature a camera facing the user, e.g. most mobile smartphones, and thus user-interfaces could respond directly to our facial expressions as set forth in certain embodiment of the present invention. In one example, an e-learning system could match its level of difficulty to the degree of puzzlement on the student's face, for example. In another example, a home health system could monitor the level of pain from an elderly person's facial expression. In further examples, other domains such as entertainment and computer gaming, automotive, or security can also benefit from such applications. As the underlying expression recognition technologies improve in accuracy, the range of applications will grow further.

Computer gaming has grown from its humble origins to become a global industry rivaling the movie industry in terms of scale and economic impact. The technology of gaming continues to improve and evolve at a very rapid pace both in terms of control interface and the graphical display of the gaming world. Today's user interfaces feature more sophisticated techniques for players to interact and play co-operatively with one another. It is possible to have real-time video and audio links between the real players so they can co-ordinate their group gameplay.

However the emphasis remains on the player being drawn into the artificial game world of the computer. There is still little scope for the conventional gaming environment to reach back to the players, sensing and empathizing with their moods and feelings. Given the sophistication of modern AI game engines, it is believed that this is a missed opportunity and that gaming engines can be advantageously evolve in accordance with embodiments described below to develop and provide methods to empathize with individual game players.

Y. Fu et al have presented a framework of multimodal human-machine or human-human interaction via real-time humanoid avatar communication for real-world mobile applications (see, e.g., Hao Tang; Yun Fu; Jilin Tu; Hasegawa-Johnson, M.; Huang, T. S., "Humanoid Audio-Visual Avatar With Emotive Text-to-Speech Synthesis," Multimedia, IEEE Transactions on, vol. 10, no. 6, pp. 969-981, October 2008, incorporated by reference). Their application is based on a face detector and a face tracker. The face of the user is detected and the movement of the head is tracked detecting the different angles, sending these movements to the 3D avatar. This avatar is used for low-bit rate virtual communication. A drawback of this approach is that the shape of the avatar needs to be specified by the user and forward-backward movement of the user is not detected, so the avatar appears as a fixed-distance portrait in the display.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

FIG. 4a-4c illustrate an annotation for the global AAM, and for two sub-models: for open and closed eyes, respectively.

FIG. 6a-6c illustrate annotation for a global model, for a local sub-model, and its mirroring in order to obtain the right eye, respectively, in accordance with certain embodiments.

FIGS. 7a-7c illustrate fitting the standard AAM model, fitting the left/right eye sub-models without refitting the global model, and fitting the left/right eye sub-models and refitting the global model, respectively, in accordance with certain embodiments.

FIGS. 9a-9b illustrate a comparison of two proposed component-based versions: the two-eyes sub-model vs. the single-eye sub-model, respectively, in accordance with certain embodiments.

FIGS. 14a-14c illustrate examples of shape fitting on an unseen picture with expression and pose variations in accordance with certain embodiments.

FIG. 15 shows several plots that illustrate means over shape parameters for each of the seven universal emotions.

FIG. 16 shows a plot of FER accuracy versus the number of shape parameters.

DETAILED DESCRIPTIONS OF THE EMBODIMENTS

Figure 1:
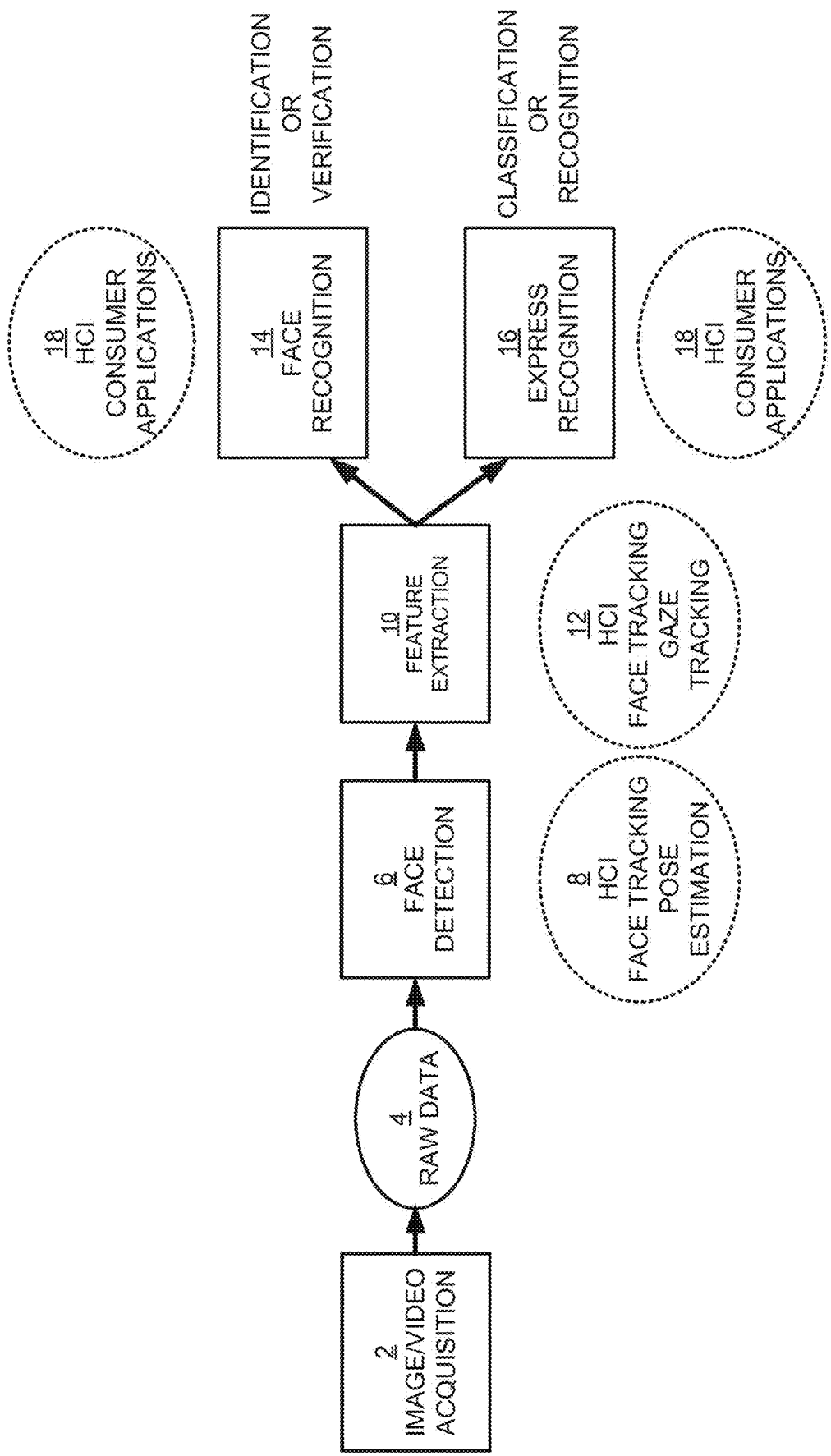
FIG. 1 schematically illustrates a facial analysis and classification system in accordance with certain embodiments.

Techniques of recognizing a facial expression or an identity of a face, or both, are provided. A face is detected and identified within an acquired digital image. The technique involves separately extracting one or more features of the face within the digital image, including two independent eyes or subsets of features of each of the two eyes, or lips or partial lips or one or more other mouth features and one or both eyes, or both. A model is applied including multiple shape parameters to the two independent eyes or subsets of features of each of the two eyes, and/or to the lips or partial lips or one or more other mouth features and one or both eyes. One or more similarities are determined between the one or more features of the face and a library of reference feature sets. A probable facial expression is identified based on the determining of the one or more similarities.

The extracting separately of the one or more features of the face may be performed before the identifying of the face.

The one or more features may include one or more geometric features. The one or more geometric features may include one or more shapes, deformations or locations of facial components, and/or pose variations.

The one or more features may include one or more appearance features. The one or more appearance features may include one or more skin texture changes such as one or more furrows, bulges, expression wrinkles, or illumination variations, and/or blushing.

The library may include face features of faces captured in multiple pose variations and/or under multiple directional illumination conditions.

The facial expression may be categorized as indicating surprise, fear, happiness, anger, neutral, sadness, disgust, or a combination thereof.

A game difficulty and/or workflow may be adapted based on the identified probable facial expression. The identified probable facial expression may be mirrored in an avatar within a game display.

The model may include an Active Appearance Model (AAM).

The multiple shape parameters may include seven or fewer shape parameters, such as six or seven.

A digital image acquisition device may be configured to recognize a facial expression or an identity of a face, or both, including any of the features described herein. The device may include a lens and image sensor for capturing a digital image, and a processor. A face detection and recognition module may be configured to program the processor to detect and identify a face within the digital image. A feature extraction module may be configured to program the processor to extract one or more features of the face within the digital image, including two independent eyes or subsets of features of each of the two eyes, or lips or partial lips or one or more other mouth features and one or both eyes, or both. A classification module may be configured to program the processor to determine one or more similarities between the one or more features of the face and a library of reference feature sets. A facial expression identification module may be configured to program the processor to identify a probable facial expression based on the determining of the one or more similarities.

One or more computer-readable media are also provided that have code embedded therein for programming a processor to perform a method of recognizing a facial expression or an identity of a face, or both, in accordance with any of the described techniques.

An advantageous modelling approach is provided for improved determination of facial expressions captured for example from a low-resolution video stream. An extension of an Active Appearance Model (AAM) is provided in certain embodiments to measure facial parameters, and a set of classifiers to determine facial states are described.

Embodiments for this technique are described for example to determine the emotional state of the players of a computer game and suggest how this information can be integrated into the workflow of a game. A number of other uses are described where the game environment can be adapted based on feedback from the players.

A direct connection back to the game player is also provided in certain embodiments. An advantageous approach to modelling and classifying the facial expressions of a game player is provided that uses a low-resolution webcam and state-of-art face detection and face modelling techniques. The system is capable of running in real-time on a standard desktop PC or other processor-enabled consumer appliance, such as on a dedicated embedded device, or converted to a dedicated hardware subsystem.

System Architecture

A system that performs automatic face recognition or expression recognition may typically comprise three main subsystems, as shown in FIG. 1: (i) a face detection module, (ii) a feature extraction module, and (iii) a classification module which determines a similarity between the set of extracted features and a library of reference feature sets. Other filters or data pre-processing modules can be used between these main modules to improve the detection, feature extraction or classification results.

FIG. 1 schematically illustrates a facial analysis and classification system in accordance with certain embodiments. The system according to the example of FIG. 1 includes a still and/or video image acquisition component 2. A raw data block 4 extracts raw image data from images acquired by the image acquisition component 2. The raw data is received at a face detection module 6. The face detection module 6 can include face tracking and/or pose estimation 8, and/or the face detection module 6 may work together with a separate face tracking and/or pose estimation module 8. A feature extraction module 10 may then include feature tracking and/or gaze tracking 12 or there may be a separate feature tracking and/or gaze tracking module 12. The system of the example of FIG. 1 then includes a face recognition module 14 and an expression recognition module 16. The face recognition module 14 may perform identification or verification as to whom a detected face specifically belongs to. The expression recognition module may perform classification or recognition of a specific facial expression or facial feature expression. These face recognition and expression recognition modules 14 and 16, respectively, may include or work in combination with consumer applications 18.

In the face detection module 6, it is decided whether the input picture or the input video sequence contains one or more faces. If so, then facial features are extracted from the detected faces using the feature extraction module 10, for example, by applying an advanced face model which encodes the facial features by a set of parameters. As a next step, using the face recognition and/or expression recognition modules 14, 16, facial features, determined as a set of output parameters from the model, are classified in order to perform facial recognition or expression classification.

Face Detection Module

In a system in accordance with certain embodiments, a face detector module 6 is employed as initialization for an AAM search. Face detection can be defined as the ability to detect and localize faces within an image or a scene. In the last few years, many different face detection techniques have been proposed in literature. A comprehensive survey of conventional face detection methods is presented at Yang, M.-H., D. J. Kriegman, and N. Ahuja, Detecting Faces in Images: A Survey. IEEE Transactions on pattern analysis and machine intelligence, 2002. 24(1): p. 34-59, incorporated by reference. State-of-the-art face detection methods provide real-time solutions that report high detection rates.

Figure 2:
FIG. 2 illustrates several examples of detected faces using the Viola-Jones algorithm.

In this field, significant advances have been due to the work of Paul Viola and David Jones who proposed a face detector based on rectangular Haar classifiers and the integral image representation of an input image, e.g., at P. A. Viola, M. J. Jones, "Robust real-time face detection", International Journal of Computer Vision, vol. 57, no. 2, pp. 137-154, 2004, incorporated by reference. Such face detection methods are among the fastest reported in the literature so far. It is able to perform for semi-frontal faces in real-time and is highly accurate. In certain embodiments, the Viola-Jones face detector is employed as initialization for an AAM search. An example of face detection using a Viola-Jones based method is shown in FIG. 2. This algorithm has been implemented in OpenCV, as reported, e.g., at http://www-.mathworks.com/matlabcentral/fileexchange/19912, and G. Bradski, A. Kaehler, and V. Pisarevski, "Learning-based computer vision with intel's open source computer vision library," Intel Technology Journal, vol. 9, no. 2, pp. 119-130, May 2005, which is a free computer vision library used widely by the computer vision research community.

Feature Extraction Module

In certain embodiments, the AAM approach is extended for facial feature extraction. AAM can be utilized as a powerful tool for image interpretation in accordance with certain embodiments, particularly when dealing with generalized facial expressions. It is a global face model whereas the key features which determine facial expressions are local features. It is these local features which are responsible for most of the relevant facial variation.

Component-based AAM, e.g., see Zhang and F. S. Cohen Component-based Active Appearance Models for face Modeling, in International Conference of Advances in Biometrics, ICB, Hong Kong, China, Jan. 5-7, 2006, incorporated by reference, offers a practical solution that may be combined with other described features within certain embodiments. It combines a global face model with a series of sub-models. These sub-models may be typically component parts of the object to be modeled. This approach benefits from both the generality of a global AAM model and the local optimizations provided by its sub-models. The model may be adjusted through training to be robust to small to medium pose variations and to directional illumination changes.

Expression Classification Module

In various embodiments, generally either of two classifiers are used: Nearest Neighbor (NN) and Support Vector Machine (SVM), e.g., as described at Vishnubhotla, S., Support Vector Classification. 2005, and Dasarathy, B. V., Nearest Neighbor (NN) Norms: NN Pattern Classification Techniques. 1991, respectively, incorporated by reference. The Euclidean-NN rule or the cosine-NN rule may be used. These classifiers may use the relevant AAM parameters in accordance with certain embodiments to choose between facial expressions.

The Extraction of Facial Features Using AAM

Statistical models of appearance such as AAM may be used as a deformable model, capable of interpreting and synthesizing new images of an object of interest. The desired shape to be modelled—in our case a facial region—is annotated by a number of landmark points. A shape vector is given by the concatenated coordinates of all landmark points and may be formally written as, s=(x1, x2, . . . , xL, y1, y2, . . . , yL)T, where L is the number of landmark points. The shape model may be obtained by applying Principal Component Analysis (PCA) on the set of aligned shapes, e.g., as follows:

$$s = \bar{s} + \varphi_s b_s, \bar{s} = \frac{1}{N_s} \sum_{i=1}^{N_s} s_i \tag{1}$$

where $\bar{s}$ is the mean shape vector, and $N_S$ is the number of shape observations; $\varphi_s$ is the matrix having the eigenvectors as its columns; $b_s$ defines the set of parameters of the shape model.

The texture, defined as the pixel values across the object of interest, may also be statistically modelled. In one embodiment, face patches are first warped into the mean shape based on a triangulation algorithm. Then a texture vector $t=(t1, t2, \ldots, tp)^T$ is built for each training image by sampling the values across the shape normalized patches. The texture model is also derived by means of PCA on the texture vectors:

$$t = \bar{t} + \varphi_t b_t, \bar{t} = \frac{1}{N}\sum_{i=1}^{N_t} t_i \quad (2)$$

where $\bar{t}$ is the mean texture vector, with $N_t$ as the number of texture observations; $\varphi_t$ is the matrix of eigenvectors, and $b_t$ the texture parameters.

The sets of shape and texture parameters $$c = \begin{pmatrix} W_s b_s \\ b_t \end{pmatrix}$$

are used in certain embodiments to describe the overall appearance variability of the modelled object, where $W_s$ is a vector of weights used to compensate the differences in units between shape and texture parameters.

After a statistical model of appearance is created, an AAM algorithm may be employed in certain embodiments to fit the statistical model to a new image. This determines the best match of the model to the image allowing to find the parameters of the model which generate a synthetic image as close as possible to the target image.

Relevant AAM Parameters for Illustrating Emotions

AAM may be used in certain embodiments to extract two types of features: geometric features and appearance features. Geometric features describe shapes, deformations and locations of facial components, and poses variations. Appearance features describe skin texture changes, e.g., furrows and bulges, blushing, expression wrinkles, illumination variations.

Geometric features are more affected when expressing emotions. As examples, when surprised, eyes and mouth open widely, the latter resulting in an elongated chin. When sad, people often blink. When angry, eyebrows tend to be drawn together. Both types of features may be advantageously used to fit an AAM model to unseen pictures. The right choice of parameters may serve to provide an optimal determination of expression, as described in more detail below.

Relevant Facial Features to Indicate Expressivity

Facial expressions are defined by the dynamics of the individual facial features. Psychophysical experiments (see, e.g., M. Nusseck, D. W. Cunningham, C. Wallraven, H. H. Bülthoff, The contribution of different facial regions to the recognition of conversational expressions, Journal of Vision, 8(8):1, pp. 1-23, 2008, incorporated by reference), indicate that the eyes and the mouth can be generally in most images the most relevant facial features in terms of facial expressions. Experiments show that, in some cases, one individual facial region can entirely represent an expression. In other cases, it is better to use the interaction of more than one facial area to clarify the expression.

A thorough description of the eye area is provided using an AAM model at I. Bacivarov, M. Ionita, P. Corcoran, Statistical Models of Appearance for Eye Tracking and Eye-Blink Detection and Measurement. IEEE Transactions on Consumer Electronics, August 2008, incorporated by reference. A detailed AAM lip model, including a hue filtering is proposed for the lips area at I. Bacivarov, M. C. Ionita, and P. Corcoran, A Combined Approach to Feature Extraction for Mouth Characterization and Tracking, in ISSC, Galway, Ireland, 2008, incorporated by reference. Each of these independent models may be used alone or in combination for expression recognition.

On average, in certain embodiments, the scores obtained for the eyes shape represent 70% of the information contained by the entire face shape and the mouth is also an important emotion feature carrier for certain emotions, e.g., surprise, with around 60% independent contribution in certain embodiments. Further, when combined and processed together emotion decoding accuracies increase.

Component-Based AAM Representation of Expressivity

Component-based AAM, as described for example at Zhang and F. S. Cohen Component-based Active Appearance Models for face Modelling, in International Conference of Advances in Biometrics, ICB, Hong Kong, China, Jan. 5-7, 2006, incorporated by reference) is an approach that benefits from both the generality of a global AAM model and the local optimizations provided by its sub-models. In addition to a global model, component models of the mouth and two eye-models and/or other features may be used alone or in combination.

In summary, a component-based algorithm may be used in certain embodiments as follows. Two sub-models are built, one for the eye region and one for the lips. The eye sub-model is then derived in a left and, respectively, a right eye model. At each iteration, the sub-models are inferred from the global model. Their optimums are detected by an AAM fitting procedure. Then, the fitted sub-models are projected back into the global model.

Improved Component Eye Models

Extension of the Eye Model

An initial eye model may be based in certain embodiments on a standard formulation of AAM, e.g., as in T. F. Cootes, G. J. Edwards, and C. J. Taylor, "Active appearance models", Lecture Notes in Computer Science, vol. 1407, pp. 484-, 1998, incorporated by reference. The model may use a detailed analysis of the eye region in terms of degree of eyelid opening, position of the iris, and/or shape and/or texture of the eye. The model may be designed to be robust to small pose variation. Blink and gaze actions may also be modelled as in I. Bacivarov, M. Ionita, P. Corcoran, Statistical Models of Appearance for Eye Tracking and Eye-Blink Detection and Measurement. IEEE Transactions on Consumer Electronics, August 2008 and/or Ioana Barcivarov, "Advances in the modeling of Facial Subregions and Facial Expression using Active Appearance Modeling Techniques", PhD Thesis, National University of Ireland Galway, June 2009, each being incorporated by reference.

Other expression conditions that may be taken into account in certain embodiments include head pose, occlusions of one or more components of the eye model, and/or differences in expression between the two eyes such as "winking" where one eye is open, and the other closed. In certain embodiments, an advantageous model is not constrained to the variations learned during the training phase. For example, this permits the two eyes to deform together and/or independently.

Figure 3:
FIG. 3 illustrates an example of poor fitting for winking in-plane-rotated eyes in accordance with certain embodiments.

A visual explanation is provided by FIG. 3 which presents two types of challenges: in-plane-head-rotation and independent actions of the eyes, i.e., winking. FIG. 3 illustrates an example of poor fitting for winking in-plane-rotated eyes. This example is advantageously included with other examples including two eyes open or closed in certain embodiments.

A component-based AAM, as described for example at M. D. Cordea, E. M. Petriu, T. E. Whalen, "A 3D-anthropometric-muscle-based active appearance model, in IEEE Symposium on Virtual Environments", Human-Computer Interfaces and Measurement Systems, (VECIMS), pp. 88-93, 2004 and/or H. Choi, S. Oh, "Real-time Recognition of Facial Expression using Active Appearance Model with Second Order Minimization and Neural Network", International IEEE Conference on Systems, Man and Cybernetics, SMC 06, vol. 2, pp. 1559-1564, is used in certain advantageous embodiments that do not constrain model components to global variations. A face model may combine a global model with a series of sub-models. This approach benefits from both the generality of a global model and the local optimizations provided by its sub-models. This approach is adapted in certain embodiments to independently model the eye regions within a face. Two advantageous example versions of the component-based model adapted for the eye region are described below, particularly for application of facial expression recognition.

Component-Based AAM Formulations

In a first stage, a component-based AAM is provided for the eye-region using two different approaches. For the first approach, the open-eye and closed-eye states are modelled separately. For the second approach, each eye is modelled separately, retaining the mixed (overlapping points) open/closed information for each eye region.

Separation of Open and Closed Eye States

In our first approach, the two-eye appearance for open or closed eyes is used. Mixing open and closed eye shapes or textures can introduce errors into the model, and so care is taken here in developing the model. First, a global model uses both eyes open and then both eyes closed. The model is refined with two sub-models modelling only some particular features of both eyes, meticulously annotated as shown in FIG. 4. A first sub-model represents components of open eyes, i.e. inner eyelid and iris. A second sub-model represents components of closed eyes, i.e., inner eyelid and outer eyelid.

In the case of closed eyes, the inner eyelid is not composed by overlapped points, but represented as a straight line. The eyebrows may be included in the global model for better eye location. They are considered generally superfluous for local modelling stages, as the eyebrows may be mostly used for accurate eye location. In these stages, the eye location is believed accurate, coming from the initial global stage.

Figure 5:
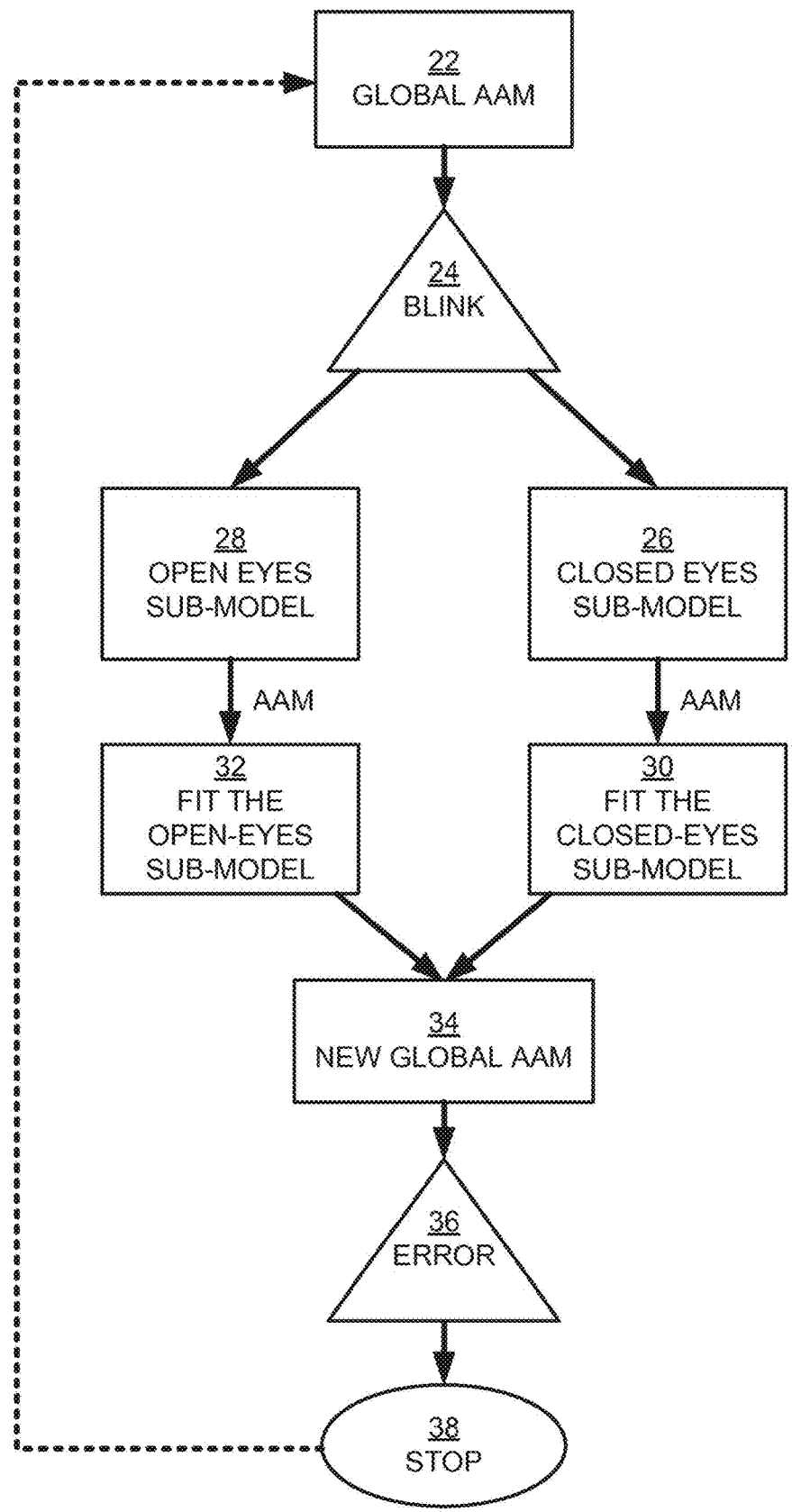
FIG. 5 illustrates a fitting algorithm for open and closed eyes sub-models in accordance with certain embodiments.

The fitting process is represented in FIG. 5. Firstly, the global AAM is matched 22 which gives a rough eye modeling. Then, a blink detector is applied 24, determining if the eyes are open or closed. Next, the corresponding sub-model is applied, e.g., the closed-eyes sub-model 26 may be applied if the blink detector 24 indicates a blink, and otherwise the open-eyes sub-model 28 may be applied. This local sub-model provides a more accurate match to the eye-region.

Only one of the open or closed sub-models is typically used in this fitting process at 30 or 32, saving computational time. A new global AAM may be applied at 34, along with an error check at 36 before the process is stopped 38. Another advantage is the accuracy of the shape annotation, as closed-eye shape is no longer obtained from open-eye shape. In consequence, fewer errors are introduced in the appearance model. The blinking information is still extracted thanks to the global model, but the accuracy of the shape is refined by the relevant sub-model.

Independent Modeling of the Left and the Right Eyes

In a second approach, each eye is modelled independently. A two-eye global model may be used for an accurate location and initial modeling. Then, the matching of each of the two eyes is performed independently.

A global model is created using both eyes open and closed. Then a separate sub-model is created describing a single open or closed eye and the different variations in between the two states. The two models, i.e., one global model and one sub-model, are trained and are independently generated using the same procedures described above.

One valuable aspect of the eye-model is the symmetry between the two eyes. This characteristic permits, starting from one eye model, e.g. left eye, to auto-generate an equivalent model for the other eye, e.g., right eye, respectively, simply by mirroring the data. An additional advantage is reduced memory space requirements, as only one set of eye-model characteristics is stored. This can be very important when considering the implementation of such techniques in low-cost consumer electronic devices such as gaming peripherals.

An advantage of this modelling approach is that it permits that the two eyes find their optimal position and shape independently. There are situations, especially when dealing with large pose variations, plane rotations, occlusions, or strong facial expressions, when the 2-D projection of the eyes loses the property of global symmetry. An example of such a situation was presented in FIG. 3, where poor fitting of the global AAM was illustrated.

FIGS. 6a-6c illustrate a fitting algorithm adapted for this component-based version in accordance with certain embodiments. FIGS. 6a-6c illustrate examples of annotation for the global model, for the local sub-model and its mirroring in order to obtain the right eye, respectively. Initially the global AAM is fitted, roughly locating the two eyes. The points of the global model which correspond to the sub-models are firstly extracted to form the two shape vectors, providing a good initialization for each sub-model. At each iteration, the sub-model is then inferred from the global model, its optimum is detected by an AAM fitting procedure, and the fitted sub-model is projected back into the global model providing a refined initialization for that model. Another projection of the global shape vector onto its principal components space may be used in certain embodiments. This step may be used to constrain the two independently obtained eyes such that they remain within the limits specified by the global model. In the last step of the fitting process, the fitting error for this refined global model is compared with the original global model fitting error and a decision is taken to use the global model with the least error. This process can be repeated until a convergence criteria for the global and local errors is achieved for each of the models within the component AAM framework. A single step process may be used that will generally achieve sufficient convergence if a Viola-Jones face detector has been used to provide the first initialization for the global model. A detailed process flowchart is provided in FIG. 8 and described in more detail below.

In FIGS. 7a-7c, some comparative examples are illustrated of fitting. FIG. 7a, in the first column, shows the effects of fitting a standard, holistic AAM eye model. FIG. 7b, in the middle column, illustrates the effect of fitting the independent-eyes sub-models without applying constraints from the global model. FIG. 7c, in the right column, shows the results using the independent-eyes models combined with constraints from the holistic model.

Comparison of Proposed Component-AAM Approaches

Two different versions of adapting a component-based AAM for the eye region are described. The first version locally models both eyes, separating the open and closed eye situations. The second version independently models each eye, but it simultaneously includes open and closed eyes. Both versions may be trained using the same training set as for the standard eye model. A dataset of 70 pictures, e.g., may be carefully selected to provide a high degree of variability in terms of subject individuality, pose, illumination, and facial features. Samples of the training set are illustrated at FIGS. 7a-7c, and see the appendix of Ioana Barcivarov, "Advances in the modeling of Facial Subregions and Facial Expression using Active Appearance Modeling Techniques", PhD Thesis, National University of Ireland Galway, June 2009, incorporated by reference above.

Figure 8:
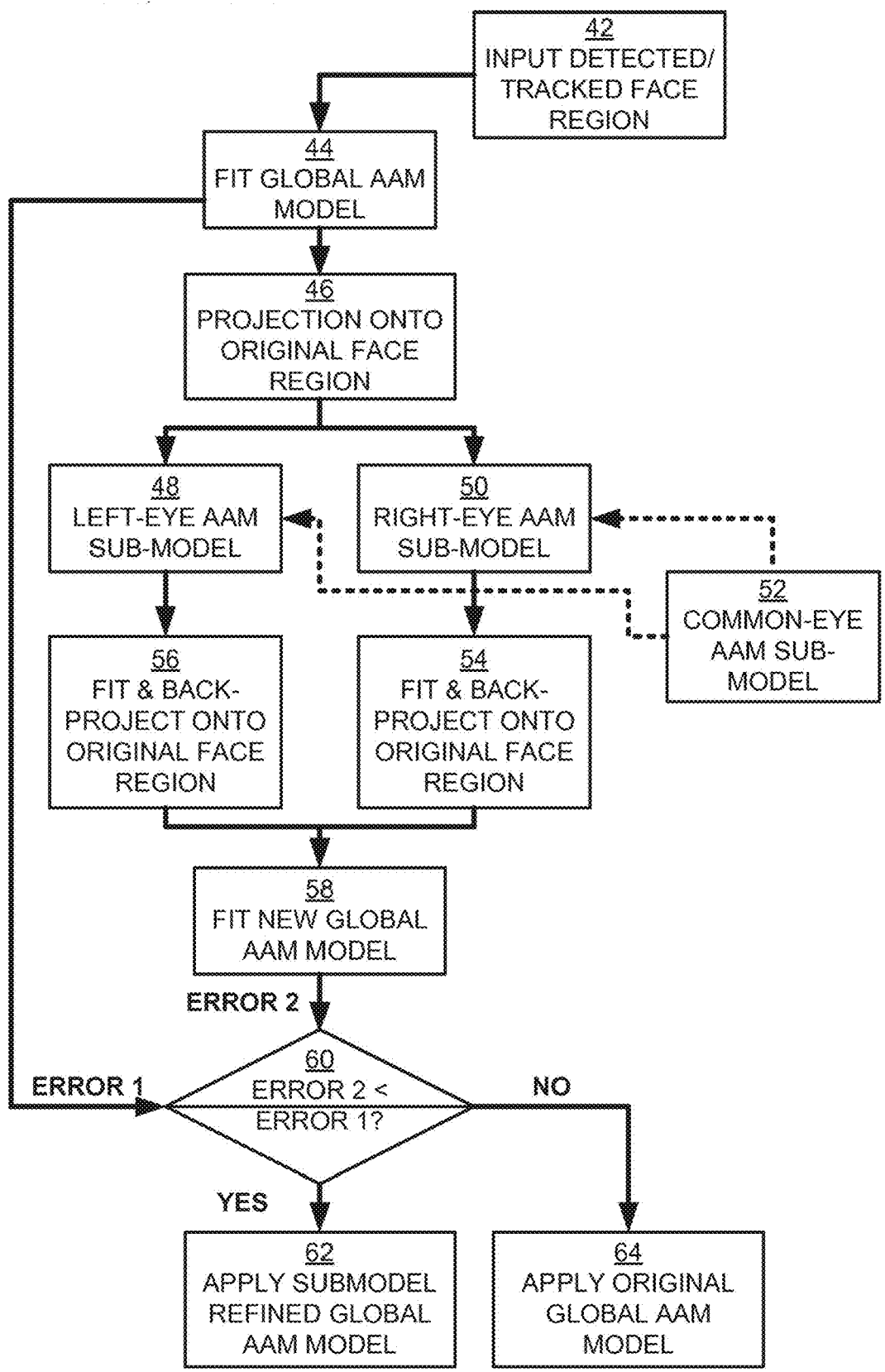
FIG. 8 illustrates a fitting algorithm for a component based AAM eye model in accordance with certain embodiments.

FIG. 8 illustrates a fitting algorithm for component based AAM eye model. First, detected and/or tracked face regions or face features are input at 42. A global AAM model is fit at 44. A projection is made onto an original face region at 46. The left eye is sub-modelled at 48 and the right eye is sub-modelled at 50. A common eye sub-model may be used as illustrated at 52 and input to the left and right eye models 48 and 50, respectively. Then the right and left sub-models are fit and back projected onto the original face region at 54 and 56, respectively. A new global model is fit at 58. An error determined at either global model fit 44 or 58 may be analyzed at 60. When an error is determined, the sub-model refined global model may be applied at 62, and if not, then the original global model may be applied.

The version of the component-based AAM which uses independent left and right eye-models proved in tests to be more useful and effective across a range of applications. In this version, local sub-models used were single-eye models, adapted for open and closed eyes. This approach proved capable of accurately determining the eye parameters, particularly in cases of facial expression, where the two eyes deform independently. It is especially robust to pose variations and to in-plane rotations.

The first version depends more particularly on the accuracy of blink detection. FIG. 9a illustrates the blink detector failing by indicating open eyes when the eye are in fact closed. This can cause a failure of the algorithm, as the open eye sub-model is chosen for fitting. Not only does it attempt to match the closed eyes with the open-eye model but the global alignment of the eye-region is lost.

Even if the global model fails by matching open eyes, the sub-models can still correctly match the eye image with closed eyes because each local model contains both open and closed-eye training data. This situation is represented in FIG. 9b. The component-based eye AAM independently modeling the left and right eye, is particularly advantageous when performing expression recognition as set below.

A Direct Quantitative Comparison of Modeling Techniques

After visually inspecting the results, a quantitative evaluation of the proposed model is performed on representative examples of the three test sets. The quantitative evaluation of a model performance is realized in terms of boundary errors, calculated as Point-to-Point (Pt-Pt) shape error, calculated as the Euclidean distance between the ground-truth shape vector and the converged shape vector inside the image frame:

$$Pt-Pt = \frac{1}{n}\sum_{i=1}^{n} ((x_i - x_i^g)^2 + (y_i - y_i^g)^2)^{1/2}, \qquad (3)$$

where the index g marks the ground truth data, obtained by hand annotation.

Another type of error can be calculated, namely the Point-to-Curve shape error. It is calculated as the Euclidian norm of the vector of distances from each landmark point of the exact shape to the closest point on the associated border of the optimized model shape in the image frame:

$$Pt-Crv = \frac{1}{n}\sum_{i=1}^{n} \min((x_i - r_x^g(t))^2 + (y_i - r_y^g(t))^2)^{1/2}, \qquad (4)$$

Figure 10:
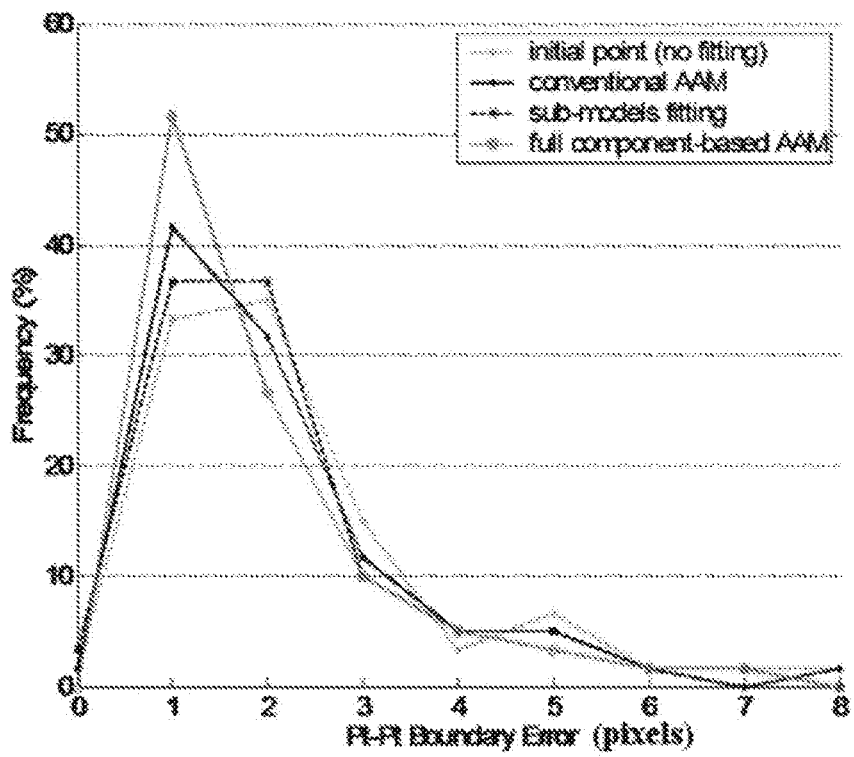
FIG. 10 illustrates a histogram of the boundary error for the three algorithms: conventional AAM, sub-model fitting and the component-based AAM.

The mean and standard deviation of Pt-Pt and Pt-Cry are used to evaluate the boundary errors over a whole set of images. FIG. 10 shows plots illustrating a histogram of Pt-Pt shape errors calculated with respect to manual ground-truth annotations. The ground-truth annotations represent hand-annotated shapes. In these tests, the standard AAM formulation, the component-based method, when omitting its last stage, i.e., the global fitting, and the component-based AAM with global fitting are illustrated in the plots. The initialization provided from the face detection step is used as benchmark.

FIG. 10 illustrates that the boundary errors for the tested fitting algorithms are concentrated within lower values as compared to the initial point generated from the detection algorithm, showing an improvement for eye location. Furthermore, the shape boundary errors are concentrated within lowest values, indicating that the full component-based AAM performs advantageously in terms of fitting accuracy, thus resulting in a clear improvement over the initial position, as well as over the other fitting algorithms. The advantages of using a component-based initialization and fitting is mirrored in the higher accuracies obtained for eye tracking, blink, or gaze detection.

Improved Lips Model

Lips models have been developed with advantageous results based on a standard AAM formulation (see, e.g., I.

Bacivarov, M. C. Ionita, and P. Corcoran, A Combined Approach to Feature Extraction for Mouth Characterization and Tracking, in ISSC, Galway, Ireland, 2008, and Ioana Barcivarov, "Advances in the modeling of Facial Subregions and Facial Expression using Active Appearance Modeling Techniques", PhD Thesis, National University of Ireland Galway, June 2009, incorporated by reference). A weak contrast between the color of the lips and the surrounding skin can provide a challenge, as there can be significant overlap in color ranges between the lips and skin regions of the face (see N. Eveno, A. Caplier, P. Y. Coulon, New color transformation for lips segmentation, Proceedings of IEEE Fourth Workshop on Multimedia Signal Processing, October 2001, Cannes, France, pp. 3-8, incorporated by reference). An improved version of an AAM lips model is provided in accordance with these embodiments. The standard AAM formulation is improved by applying a pre-processing step that offers a more accurate initialization of the lip region. The overall approach, embracing the initialization and the AAM modeling, is described below. The performance of the lip model has been tested, including developing two consumer applications: a lip tracker and a smile detector.

Initialization of the Lip Region by Chrominance Analysis

The lips model works advantageously well when a strong initialization is provided in order to achieve an accurate fitting to unseen images. Consequently, a pre-processing method is provided in accordance with these embodiments that provides such a robust initialization. Key information related to lips is their red color, although red varies with respect to individuals, make-up, illumination etc. Therefore, by filtering the red lip color from the face region, the system is better able to identify the global shape of the lip region. This approach is based on the work of Pantic et al. (see, e.g., M. Pantic, L. J. M. Rothkrantz, "Automatic Analysis of Facial Expressions: The State of the Art", IEEE Transactions on Pattern Analysis and Machine Intelligence, vol. 22, no. 12, 2000, pp 1424-1445; M. Pantic, M. Tomc, L J. M. Rothkrantz, "A Hybrid approach to mouth features detection", in Proceeding of the 2001 Systems, Man and Cybernetics Conference, 2001, pp. 1188-1193; and M. Pantic, M. F. Valstar, R. Rademaker, L. Maat, Web-based database for facial expression analysis, IEEE International Conference on Multimedia and Expo (ICME'05), http://www.mmi-facedb.com, 2005, each being incorporated by reference), and is adapted for our AAM models. Firstly, the input image is transformed into the HSV colour space, as hue representation is less affected by variations in illumination. This colour space brings invariance to shadows, shading, and highlights and it permits using only the hue component for segmentation. Then the object of interest is filtered into the red domain, by applying the following hue filter (see S. Chindaro, F. Deravi, "Directional Properties of Colour Co-occurrence Features for Lip Location and Segmentation", Proceedings of the 3rd International Conference on Audio and Video-Based Biometric Person Authentication, pp. 84-89, 2001):

$$f(h) = \begin{cases} \frac{1-(h-h_0)^2}{w^2} & |h-h_0| \le w \\ 0 & |h-h_0| > w \end{cases} \quad (5)$$

where h is the shifted hue value of each pixel so that $h_0=1/3$ for red color. Note that $h_0$ controls the positioning of the filter in the hue color plane and w controls the color range of the filter around its $h_0$ value. As the color for the lip region varies with respect to person identity, light conditions, make-up, etc., the challenge is to find optimal parameters for the filter. Although an optimal solution would be an adaptive hue filter, the simplified solution adopted in our case is to find the optimal parameters for predefined conditions, e.g., for a specific database.

A statistical analysis was performed on our training set to study the variation of lip colour between individuals and the differences caused by varying illumination on lip pixels for the each picture was investigated. Standard deviation does not vary much from picture to picture, as the pictures belong to the same database, with controlled acquisition conditions. The filter coefficients are chosen after performing an average on the mean and on the standard deviation for all pictures. The overall mean is 0.01 and it corresponds to the positioning of the filter $h_0$. The overall standard deviation approximating the filter width w is 0.007.

Figures 11A, 11B, 11C:
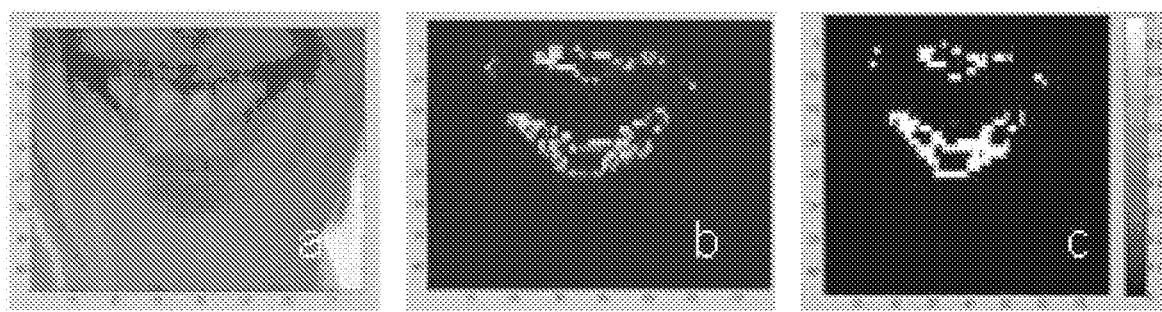
FIGS. 11a-11c illustrate lip region pre-processing and show an original image, an after the hue filter representation, and an after the binarization representation, in accordance with certain embodiments.

After determining the parameters of the filter and performing the actual filtering operation, each image may be binarized using a predefined threshold, as illustrated at FIGS. 11a-11c, which show lip region pre-processing of original image, a representation achieved after the hue filter, and a further representation achieved after binarization. The value of this threshold was set to 0.5, determined after a trial-and-error testing. Morphological operations such as closing, followed by opening, can be used in order to fill in gaps and to eliminate pixels that do not belong to the lip region. After the lip region is determined, its center of gravity (COG) is calculated. This point is then used as the initialization point for the AAM fitting algorithm.

Formulation of an AAM Lip Model

Figure 12:
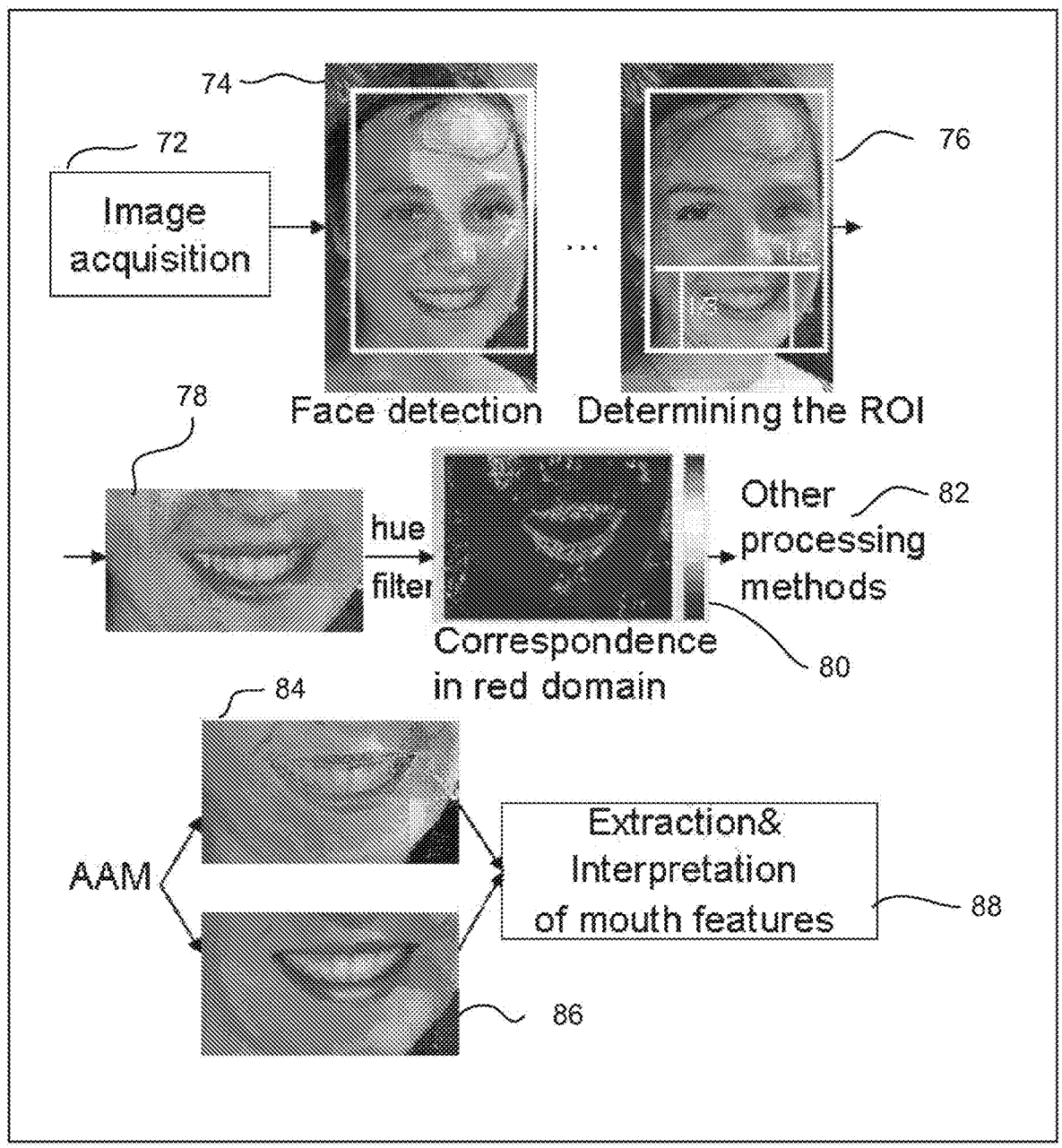
FIG. 12 illustrates a lip modeling system overview in accordance with certain embodiments.

A lips modelling in accordance with certain embodiments is composed of two main steps: an initialization step and a modeling step. Referring to FIG. 12, an image is acquired 72. Before the lip feature can be extracted and analysed, a face is detected 74 in the acquired image and its features are traced. The face is inferred from the Viola-Jones face detector applied on the input image. Then, a region of interest (ROI), i.e. the lip region, is deducted 76 from the rectangle describing the surroundings of the face. Thus the ROI is reduced to the lower third on they axis, while ⅗ of the face box is retained on the x axis, as illustrated at box 78 of FIG. 12. A hue filter is then used to provide an initial location of the lip region within this ROI, as illustrated by correspondence in the red domain 80 and other processing methods 82.

In a further step, AAM is applied at 84 and 86 in order to perform a refined detection and to determine detailed lips features. The starting point for the algorithm is the COG of the hue filtered ROI. The AAM adjusts the parameters so that a synthetic example is generated, which matches the image as closely as possible, as seen in FIG. 12. Optimal texture and shape parameters are determined using the standard AAM lip model. In consequence information regarding lip features, such as its curvature, degree of opening, or its texture, can be readily determined. Extraction and interpretation of mouth features 88 is thereby provided in accordance with certain embodiments.

The Full Component-AAM Face Model

It is impractical to include all possible variations of shape and texture in a training set, particularly with limited processing resources such as with an embedded device. The overall degrees of freedom inherent in the model are restricted by the number of model parameters. That is, a model which did incorporate practically all possible facial variations in its training set would have a correspondingly large set of model parameters making it unwieldy and impractical, particularly for applications in consumer electronics or for implementations in low-cost gaming peripherals. Thus any practical model would restrict its potential variations. To achieve real improvements, more than a single holistic AAM model is provided in accordance with certain embodiments.

The component-based AAM may be adapted for facial expression analysis. This approach benefits from both the generality of a global AAM and the optimizations provided by local sub-models. It adds degrees of freedom to the global model, by accounting for individual variations of facial features.

Figure 13:
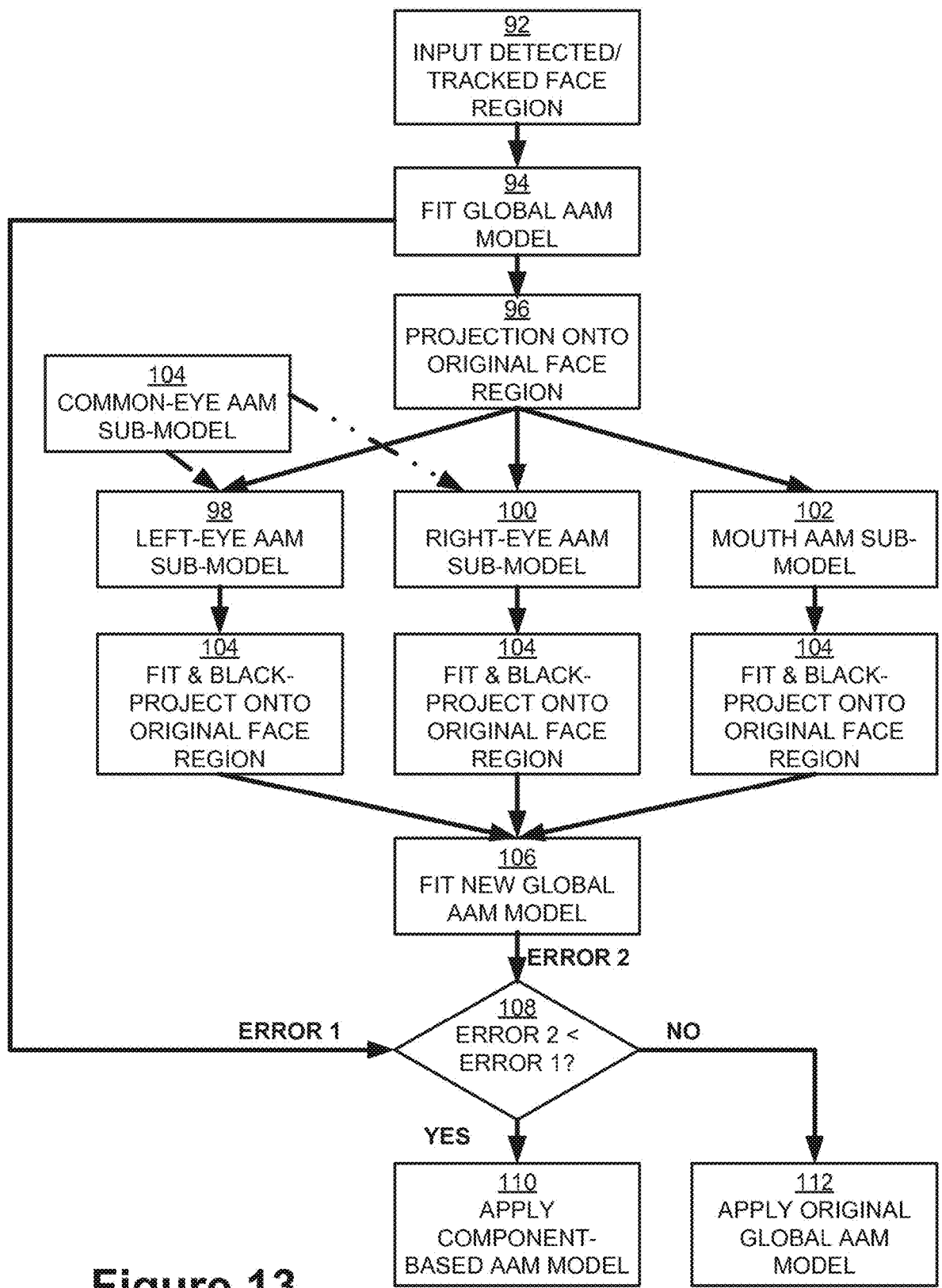
FIG. 13 illustrates full component-AAM Face Model incorporating both improved Eyes and Lips models in a single component-AAM framework.

FIG. 13 illustrates a full component-AAM Face Model incorporating both improved Eyes and Lips models in a single component-AAM framework. A detected and/or tracked face region is input at 92. A global AAM model is fit at 94. A projection onto an original face region is provided at 96. Left eye, right eye and mouth AAM sub-models are applied at 98, 100 and 102, respectively. A common eye AAM sub-model may be used with the left and right eye sub-models 98 and 100, respectively, as described above. Each sub-model 98, 100, and 102 is then fit and back projected onto the original face region at 104. A new global AAM model is fit at 106. If there are errors at the global AAM model fit steps 94 or 106, then it is determined at 108 to apply the component based AAM model 110 and if not, then to apply the original global AAM model 112.

Now FIG. 13 explains the further adaptation for the entire face region, using two sub-models: both an eye model and a lips model. As for the eye region model, at each iteration, the relevant sub-models are inferred from the global model. Optimal fittings are determined through an AAM fitting procedure, based solely on shape parameters. Then, the fitted sub-models are projected back into the global model.

FIGS. 14a-14c illustrate one practical example of the benefits of a component-based representation, on an image containing both pose and expression variations. This shows how the sub-models improve fitting of the global model to the entire face region, which in turn improves the alignment of each sub-model with the local features which are important to accurate expression recognition. FIG. 14a is a result of a conventional AAM. FIG. 14b represents the fitting of the AAM sub-models. FIG. 14c depicts the component-based result.

Now, in order to quantitatively evaluate the overall performances of a component-based AAM, its accuracy is measured in terms of expression classification/recognition rates. First, consider which AAM features are most relevant for expression analysis.

Relevant Feature Extraction for Facial Expressions

Feature selection involves keeping the most relevant features for classification and discarding irrelevant or redundant features. The quality of the extracted features plays a key role in their classification. Two types of features can be extracted when applying an AAM: geometric features and features depicting the texture. Optionally, appearance parameters can be obtained by applying PCA on the concatenated geometric and texture parameters. Information regarding both types of features are valuable when fitting an AAM model to unseen images. Now it is determined which of these parameters are more significant for determining and recognizing facial expressions.

Features for Facial Expression Recognition (FER)

Shape features have a large role to play in facial expression recognition (see, e.g Lucey, S., A. B. Ashraf, and J. Cohn, "Investigating Spontaneous Facial Action Recognition through AAM Representations of the Face", Face Recognition Book, edited by K. Kurihara, ProLiteratur Verlag, Mammendorf, Germany, 2007, and Zalewski, L. and S. Gong. "2D statistical models of facial expressions for realistic 3D avatar animation", in Computer Vision and Pattern Recognition, CVPR, 20-25 Jun. 2005, each being incorporated by reference). It may be advantageous to have both shape and texture features to achieve results (Kotsia, I., et al. "Texture and Shape Information Fusion for Facial Action Unit Recognition", in First International Conference on Advances in Computer-Human Interaction (ACHI), 2008, incorporated by reference).

On one hand, the skin texture of the facial region exhibits only slight changes during facial expressions. These minor changes arise due to local lighting effects, blushing, or wrinkling of the skin. Such changes can be considered relatively invariant when compared with the more obvious changes of shape observed for different facial expressions. Such geometrical features are very directly related to expressions. As examples, when surprised, we widely open the eyes and eventually the mouth, resulting in an elongated chin; when sad, we often blink; when angry, the eyebrows are usually drawn together. Thus, shape parameters are typically the most significant features in facial expression decoding.

Quantitative Determination of AAM Parameters for FER

While shape parameters of an AAM face model contain the greatest "information density" for determining facial expression, there can tend to be a significant amount of redundant information within this parameter set. Contrawise, there may also be significant useful information contained in a small subset of the texture parameters. Advantageously, we have further refined our use of AAM model parameters to achieve a more optimal set of parameters which are more closely tuned to facial expression analysis.

The particular shape parameters that best represent facial expressions were investigated. A customized database and images from the FEEDTUM database were used. A set of 42 images were used to train the improved component model, 21 from each database. This training set was picked to include images of many different individuals, with varying facial poses, and facial expressions. Corresponding recognition tests were performed on a set of 50 unseen images from a database and 100 from FEEDTUM. A Euclidean NN based classifier was used for measuring each category of facial expression and, after discarding the lowest order shape parameter which is dominated by the facial pose information, the 17 lowest order shape parameters of the AAM model were used as features.

FIG. 15 show plots that illustrate means of shape parameters over each of the seven universal emotions. FIG. 15 includes plots of expression recognition rates versus numbers of model parameters employed. This illustrates the mean over the AAM shape parameters for each of the six universal facial expressions and the neutral one of the training set.

A maximum of 17 shape parameters is used in total in accordance with certain embodiments. Then, the number of parameters is reduced, eliminating in turn the parameter with the smallest variation across the test set of images. As the number of parameters is reduced, what are left are the parameters which exhibit the widest variation. These results are presented in the plot of FIG. 16, where FER accuracy is plotted against the number of shape parameters used in that particular test.

Optimal results are obtained in accordance with certain embodiments when the five to six most variable parameters are used. As the number of parameters is increased beyond the $6^{th}$ parameter, the model accuracy deteriorates. An educated choice of parameters positively affects the system performances. It is shown empirically that using the first 30-40% of model parameters provides higher expression recognition rates.

A Note on the Lowest-Order Shape Parameter

After performing PCA on shape parameters, the information on out-of-plane head pose was encoded in the first shape parameter. This is explained by the fact that the variations caused by pose cause significantly more geometric distortion than the variation caused by differences between individuals or between facial expressions. Consequently, pose variation is uncorrelated to a large extent with other sources and manifests itself in the first-order PCA parameter.

Figure 17:
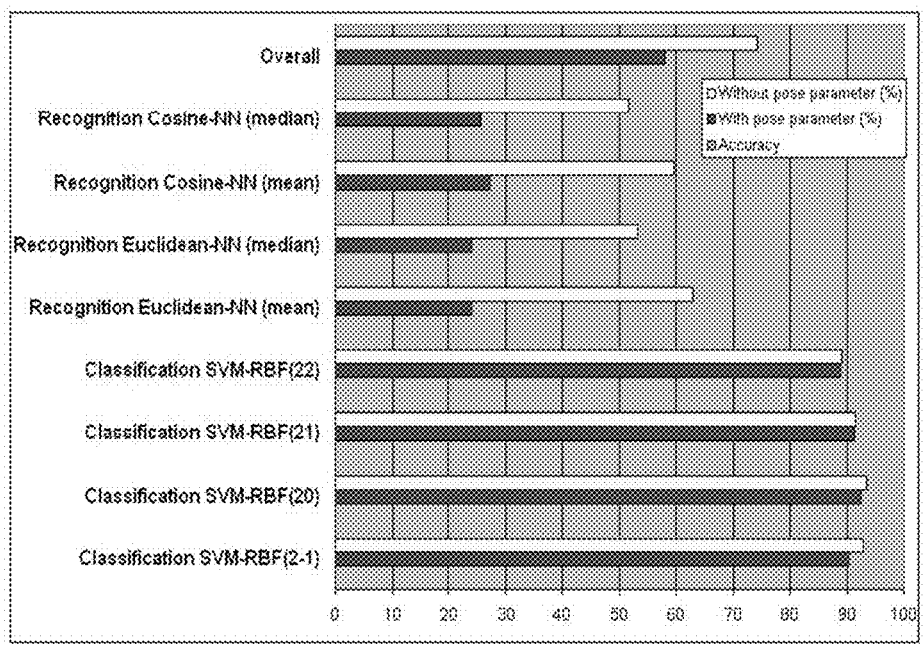
FIG. 17 illustrates different FER classification schemes comparing recognition rates with and without the lowest order AAM shape parameter.

FIG. 17 shows bar graphs that illustrate different FER classification schemes comparing recognition rates with and without the lowest order AAM shape parameter. The pose parameters are advantageous for the AAM fitting stage and the subsequent extraction of facial features. The pose variation information contributes to the shape and texture of facial features. However when analyzing facial expressions, the lowest order pose parameter should generally be eliminated, as it will not contain the required facial expression information. This is illustrated in FIG. 17, where a range of FER classification methods are compared each with and without the first-order AAM pose parameter. SVM based methods are more robust than NN methods to pose. Even where the effect of this pose parameter is negligible, it still adds an additional computational burden which is redundant as even for SVM the recognition rates are slightly lower with this parameter included. This would not be the case if the model is trained using only frontal images, but then the model would not be able to generalize to non-frontal faces.

Conclusions on the Significance of AAM Features

Based on the results of these tests, shape parameters did indeed prove to be overall the most valuable features for facial expression decoding accuracy. Other tests confirmed that while shape results are comparable with the results obtained when applying a combined shape and texture model, i.e., when using the AAM appearance features, the number of shape parameters is significantly less. In turn the computational requirements both for feature extraction and to subsequently perform classification are also reduced. Thus, shape parameters on their own have a demonstrable advantage over approaches based on texture-only and both concatenated and merged shape and texture. These finding were also confirmed by the authors Zalewski, L. and S. Gong, see "2D statistical models of facial expressions for realistic 3D avatar animation", in Computer Vision and Pattern Recognition, CVPR. 20-25 Jun. 2005, incorporated by reference. The accuracy rates of classification were not specifically addressed in this series of experiments. Improvements are described below to increase the accuracy of expression classifiers.

Expression Classification and Recognition

The last step in a facial expression recognition (FER) system is expression classification and recognition. Two classifiers may be compared: SVM and NN (see Gualtieri, J. A. and R. F. Cromp. Support vector machines for hyperspectral remote sensing classification, in 27th AIPR Workshop: Advances in Computer-Assisted Recognition. 1998. Washington, D.C.: SPIE, incorporated by reference). In accordance with certain embodiments, the classifiers use as input relevant AAM parameters and they present at output the choice between two facial expressions. When dealing with poses, the pose parameters may be discarded.

Defining a Fixed Set of Classes for Facial Expression

Facial Action Coding System (FACS), originally developed by Ekman and Friesen in 1976 (see, Ekman, P. and W. Friesen, "Facial Action Coding System: A Technique for the Measurement of Facial Movemen", Consulting Psychologists Press, Palo Alto, 1976, incorporated by reference) is the most widely used coding system in the behavioural sciences. The system was originally developed by analysing video footage of a range of individuals and associating facial appearance changes with contractions of the underlying muscles. The outcome was an encoding of 44 distinct action units (AUs), i.e., anatomically related to contraction of specific facial muscles, each of which is intrinsically related to a small set of localized muscular activations. Using FACS, one can manually code nearly any anatomically possible facial expression, decomposing it into the specific AUs and their temporal segments that produced the expression. Resulting expressions can be described using the 44 AUs described by Ekman or combinations of the 44 AUs. In 2002, a new version of FACS was published, with large contributions by Joseph Hager (see, J. Hager, P. Ekman, and W. Friesen, "Facial action coding system", Salt Lake City, Utah: A Human Face, 2002, incorporated by reference).

Figure 18:
FIG. 18 illustrates on each row examples of the six universal facial expressions and the neutral state, as expressed by different subjects (in order, anger, happiness, neutral, surprise, fear, sadness, and disgust).

Ekman and Friesen have also postulated six primary emotions which they consider to be universal across human ethnicities and cultures. These six universal emotions, commonly referred as basic emotions are: happiness, anger, surprise, disgust, fear, and sadness, illustrated in FIG. 18, which also includes the neutral state in the third row from the top. The six basic emotions and the neutral state are expressed in FIG. 18 by different subjects. In order from top row to bottom row, FIG. 18 illustrates anger, happiness, neutral, surprise, fear, sadness, and disgust. The leading study of Ekman and Friesen formed the origin of facial expression analysis, when the authors proclaimed that the six basic prototypical facial expressions are recognised universally. Most researchers argue that these expressions categories are not sufficient to describe all facial expressions in detail. The neutral expression, or a face without expression, is included as a seventh category in accordance with certain embodiments.

Expression Classification

The choice of the two classifiers is based on their positive results obtained in the literature. E.g., in T. F. Cootes, G. J.

Edwards, and C. J. Taylor, "Active appearance models", Lecture Notes in Computer Science, vol. 1407, pp. 484-, 1998, incorporated by reference, it is stated and it is proved by experiments for gender classification and face recognition that SVM is typically among the top two classifiers, and the other top ranking classifier is one of the Euclidean-NN rule or the cosine-NN rule.

Nearest Neighbour (NN)-Based Classifier

Some experimental results are provided below with variations on the NN technique to determine its practical utility. In particular, several different types of similarity metric and templates for NN were investigated, including the Euclidean, cosine, and Mahalanobis distances. Also, two types of templates can be employed, based on calculating the mean or the median over the input AAM parameters.

For these experiments, each picture in the test set is classified by comparing its parameters with a template corresponding to each expression. The class yielding the minimum distance is selected. The templates for each class are obtained by a mean, or a median, over the shape parameter vector for each expression. The classifiers are of type expression 1/expression 2, i.e., neutral/non-neutral, sad/non-sad, angry/non-angry, disgusted/non-disgusted, fear/non-fear, surprised/non-surprised, and happy/non-happy, and of type expression/non-expression. Considering that there are six expressions and the neutral one, then 28 classifiers are obtained, seven for the former type and 21 for the latter.

For a first set of experiments, the AAM training and test sets coincide, i.e., there are no unseen images. This is so that the results are not biased with poor AAM fittings. The Tables NN1-NN4 summarise the classification rates, as for example, in Table 8.2: the system 80% correctly recognises angry from non-angry faces and 75% angry from disgusted faces.

TABLE NN1

EXPRESSION CLASSIFICATION ACCURACIES (%) FOR THE MMI DATABASE (TRAINING AND TEST SETS OVERLAP) WHEN USING A NN WITH A MEAN TEMPLATE RULE - AVERAGE OF EXPRESSION CLASSIFICATION 83.67%.

|    | A  | D    | F    | H    | N    | Sa   | Su   |
|----|----|------|------|------|------|------|------|
| A  | 80 | 75   | 85   | 90   | 75   | 80   | 87.5 |
| D  |    | 87.5 | 85   | 95   | 92.5 | 95   | 95   |
| F  |    |      | 57.5 | 85   | 67.5 | 72.5 | 82.5 |
| H  |    |      |      | 87.5 | 85   | 95   | 95   |
| N  |    |      |      |      | 80   | 70   | 85   |
| Sa |    |      |      |      |      | 85   | 87.5 |
| Su |    |      |      |      |      |      | 85   |

TABLE NN2

EXPRESSION CLASSIFICATION ACCURACIES (%) FOR THE MMI DATABASE (TRAINING AND TEST SETS OVERLAP) WHEN USING A NN WITH A MEDIAN TEMPLATE RULE - AVERAGE OF EXPRESSION CLASSIFICATION 83.41%.

|    | A    | D  | F    | H    | N    | Sa   | Su   |
|----|------|----|------|------|------|------|------|
| A  | 82.5 | 90 | 72.5 | 77.5 | 77.5 | 90   | 85   |
| D  |      | 85 | 90   | 82.5 | 90   | 97.5 | 92.5 |
| F  |      |    | 67.5 | 75   | 75   | 85   | 82.5 |
| H  |      |    |      | 77.5 | 75   | 87.5 | 90   |
| N  |      |    |      |      | 90   | 72.5 | 85   |

TABLE NN2-continued

EXPRESSION CLASSIFICATION ACCURACIES (%) FOR THE MMI DATABASE (TRAINING AND TEST SETS OVERLAP) WHEN USING A NN WITH A MEDIAN TEMPLATE RULE - AVERAGE OF EXPRESSION CLASSIFICATION 83.41%.

|    | A | D | F | H | N | Sa   | Su |
|----|---|---|---|---|---|------|----|
| Sa |   |   |   |   |   | 87.5 | 88 |
| Su |   |   |   |   |   |      | 85 |

TABLE NN3

EXPRESSION CLASSIFICATION ACCURACIES (%) FOR THE FEEDTUM DATABASE (TRAINING AND TEST SETS OVERLAP) WHEN USING A NN WITH A WITH A MEAN TEMPLATE RULE-AVERAGE OF EXPRESSION CLASSIFICATION 93.58%.

|    | A   | D    | F    | H    | N    | Sa   | Su  |
|----|-----|------|------|------|------|------|-----|
| A  | 100 | 96.7 | 93.4 | 100  | 96.7 | 96.7 | 100 |
| D  |     | 80   | 90   | 100  | 70   | 90   | 100 |
| F  |     |      | 83.4 | 96.7 | 80   | 93.4 | 100 |
| H  |     |      |      | 90   | 90   | 100  | 100 |
| N  |     |      |      |      | 100  | 93.4 | 100 |
| Sa |     |      |      |      |      | 80   | 100 |
| Su |     |      |      |      |      |      | 100 |

TABLE NN4

EXPRESSION CLASSIFICATION ACCURACIES (%) FOR THE FEEDTUM DATABASE (TRAINING AND TEST SETS OVERLAP) WHEN USING A NN WITH A MEDIAN TEMPLATE RULE-AVERAGE OFEXPRESSION CLASSIFICATION 89.79%.

|    | A   | D    | F    | H    | N    | Sa   | Su   |
|----|-----|------|------|------|------|------|------|
| A  | 100 | 63.4 | 93.4 | 100  | 96.7 | 90   | 100  |
| D  |     | 73.4 | 86.7 | 96.7 | 70   | 93.4 | 100  |
| F  |     |      | 73.4 | 96.6 | 66.7 | 90   | 93.4 |
| H  |     |      |      | 90   | 90   | 96.7 | 100  |
| N  |     |      |      |      | 83.4 | 86.7 | 100  |
| Sa |     |      |      |      |      | 83.4 | 100  |
| Su |     |      |      |      |      |      | 100  |

Generalization of the AAM to unseen subjects is tested in a second series of experiments with "leave-one-out" tests, in which images of the tested subject are excluded from training. A decrease in the classification accuracies is observed. Tables NN5 and NN6 summarize the corresponding results of these tests. The classifier performs better on the FEEDTUM database. The MMI presents more variations in illumination, which is a condition that affects the AAM fitting and, in consequence, the precisions of facial feature extraction, particularly for unseen images.

TABLE NN5

EXPRESSION CLASSIFICATION ACCURACIES (%) FOR THE MMI DATABASE (TRAINING AND TEST SETS DO NOT OVERLAP) WHEN USING A NN WITH A MEAN TEMPLATE RULE-AVERAGE OF EXPRESSION CLASSIFICATION 62.99%.

|    | A     | D  | F    | H    | N    | Sa   | Su   |
|----|-------|----|------|------|------|------|------|
| A  | 83.33 | 50 | 63.4 | 80   | 50   | 63.4 | 76.7 |
| D  |       | 60 | 70   | 66.7 | 56.7 | 53.4 | 73.4 |
| F  |       |    | 56.7 | 83.4 | 56.7 | 80   | 63.4 |
| H  |       |    |      | 70   | 73.4 | 53.4 | 80   |
| N  |       |    |      |      | 60   | 56.7 | 83.4 |
| Sa |       |    |      |      |      | 60   | 86.7 |
| Su |       |    |      |      |      |      | 63.4 |

TABLE NN6

EXPRESSION CLASSIFICATION ACCURACIES (%) FOR THE FEEDTUM DATABASE (TRAINING AND TEST SETS DO NOT OVERLAP) WHEN USING A NN WITH A MEAN TEMPLATE RULE-AVERAGE OF EXPRESSION CLASSIFICATION 66.94%.

|    | A     | D  | F    | H    | N    | Sa   | Su   |
|----|-------|----|------|------|------|------|------|
| A  | 83.33 | 50 | 63.4 | 80   | 50   | 63.4 | 76.7 |
| D  |       | 60 | 70   | 66.7 | 56.7 | 53.4 | 73.4 |
| F  |       |    | 56.7 | 83.4 | 56.7 | 80   | 63.4 |
| H  |       |    |      | 70   | 73.4 | 53.4 | 80   |
| N  |       |    |      |      | 60   | 56.7 | 83.4 |
| Sa |       |    |      |      |      | 60   | 86.7 |
| Su |       |    |      |      |      |      | 63.4 |

A template obtained by averaging the AAM shape parameters outperforms, slightly, a template based on the median approach. Thus in the experiments that follow, a template obtained by averaging the shape parameters is used for NN. From these experiments on NN-based expression classification, it has been determined that Euclidean and cosine distances perform almost equally well, but there is a slight advantage for the Euclidean distance from the point of view of a more consistent level of performance. Thus in accordance with certain embodiments, the Euclidean distance is used as a representative of the optimal NN technique.

Support Vector Machines (SVM) Classifier

Experiments on SVM classifiers were also performed to determine the optimal settings for SVM when applied to expression classification. Here we search for the best kernel function, and also for the optimal settings for each function. Two potential kernel functions are investigated: the residual basis function (RBF) and the polynomial function. Best grade for a polynomial kernel and the optimal δ values for an RBF kernel are searched.

In the first part of the experiment, seven SVM classifiers of type expression 1/expression 2 are built to distinguish the six universal expressions and the neutral one. The polynomial kernel, with order from 1 to 6 and the RBF kernel with δ from $2^{-2}$ to $2^6$ results are investigated. The results for the MMI database are detailed in Table SVM1. The optimal kernel function proved to be RBF, with δ fixed on small values. In certain embodiments, RBF is used based on the accuracy and the consistency of its results. In a second series of experiments, we sought to confirm the previous conclusions, this time using 28 classifiers, as in our earlier NN trials. The results, presented in tables SVM2 and SVM3, confirm that RBF with δ fixed on small values achieves the highest classification rates.

The RBF kernel function with δ fixed on small values gave the best results. Our findings are confirmed also in the literature, where the RBF kernel is the most common function to be used in expression recognition with SVM. The choice is also motivated by theory. RBF has fewer adjustable parameters than any other commonly used kernel and it thus has less numerical complexity.

TABLE SVM1

EXPRESSION CLASSIFICATION USING SVM FOR THE MMI DATABASES, WHEN USING DIFFERENT KERNELS.

| | Polynomial-grade | | | | | |
|---|---|---|---|---|---|---|
| Classifier | 1 | 2 | 3 | 4 | 5 | 6 |
| H/non-H | 88.7 | 78.7 | 82.7 | 65.4 | 59.4 | 51.4 |
| D/non-D | 56 | 46.7 | 46 | 46 | 41.4 | 40.7 |
| Su/non-Su | 74.7 | 52.7 | 51.4 | 50 | 46 | 44.7 |
| A/non-A | 51.4 | 47.4 | 47.4 | 46 | 53.4 | 53.4 |
| Sa/non-Sa | 74 | 58 | 54 | 47.4 | 45.4 | 43.4 |
| F/non-F | 78.7 | 72 | 71.4 | 64.7 | 60.7 | 54 |
| N/non-N | 62.7 | 56 | 59.4 | 54.7 | 50.7 | 45.5 |
| Average | 69.5 | 58.8 | 58.9 | 53.5 | 51 | 47.6 |

| | RBF | | | | | | |
|---|---|---|---|---|---|---|---|
| Classifier | $2^{-3}$ | $2^{-2}$ | $2^{-1}$ | $2^0$ | $2^1$ | $2^2$ | $2^3$ |
| H/non-H | 78.7 | 82 | 82.7 | 82.7 | 90 | 92.7 | 92.7 |
| D/non-D | 63.4 | 58 | 60.7 | 55.4 | 70.7 | 79.4 | 62.7 |
| Su/non-Su | 40.7 | 46.7 | 61.4 | 71.4 | 72 | 71.4 | 68.7 |
| A/non-A | 71.4 | 71.4 | 40 | 72.7 | 66 | 70 | 48 |
| Sa/non-Sa | 66 | 64 | 61.4 | 62.7 | 69.4 | 68.7 | 70.7 |
| F/non-F | 69.4 | 69.4 | 70 | 70.7 | 72.7 | 72 | 72 |
| N/non-N | 38.7 | 42.7 | 58.7 | 62.7 | 61.4 | 79.4 | 59.4 |
| Average | 61.2 | 62.1 | 62.2 | 68.4 | 71.8 | 76.3 | 67.8 |

TABLE SVM2

ACCURACY (%) OF EXPRESSION CLASSIFICATION ON FEEDTUM FOR THE AAM SHAPE PARAMETERS WHEN APPLYING A SVM CLASSIFIER FOR RBF $2^2$, AVERAGE OF EXPRESSION CLASSIFICATION 69.43%.

|    | A  | D    | F    | H    | N    | Sa   | Su   |
|----|----|------|------|------|------|------|------|
| A  | 70 | 63   | 70   | 66.7 | 70   | 70   | 73.4 |
| D  |    | 79.4 | 63.4 | 70   | 73.4 | 53.4 | 70   |
| F  |    |      | 72   | 66.7 | 56.7 | 80   | 53.4 |
| H  |    |      |      | 92.7 | 73.4 | 60   | 66.7 |
| N  |    |      |      |      | 79.4 | 53.4 | 80   |
| Sa |    |      |      |      |      | 68.7 | 76.7 |
| Su |    |      |      |      |      |      | 71.4 |

TABLE SVM3

ACCURACY (%) OF EXPRESSION CLASSIFICATION ON MMI FOR THE AAM SHAPE PARAMETERS WHEN APPLYING A SVM CLASSIFIER FOR RBF $2^2$, AVERAGE OF EXPRESSION CLASSIFICATION 62.59%.

|    | A    | D  | F    | H    | N    | Sa   | Su   |
|----|------|----|------|------|------|------|------|
| A  | 62.5 | 55 | 65   | 52.5 | 52.5 | 55   | 65   |
| D  |      | 65 | 65   | 52.5 | 60   | 62.5 | 77.5 |
| F  |      |    | 55   | 62.5 | 60   | 52.5 | 77.5 |
| H  |      |    |      | 57.5 | 57.5 | 65   | 75   |
| N  |      |    |      |      | 52.5 | 57.5 | 77.5 |
| Sa |      |    |      |      |      | 57.5 | 75   |
| Su |      |    |      |      |      |      | 80   |

Expression Recognition

Now, after training a set of classifiers to discriminate between two facial expressions, we would like to be able to associate a human face with one of the six universal expressions or the neutral one. This process is known as facial expression recognition. We will again compare NN and SVM based techniques, but this time adapted for a multi-class decision framework.

Nearest Neighbour

The first set of experiments was performed on FEEDTUM, MMI and our own database using the Euclidean-NN and the optimal number of 7 shape parameters. Between 20 and 30 pictures were used for training and 150 test images were drawn each from FEEDTUM and MMI with an additional 50 from our own database. Table AAM1 summarizes expression recognition rates when a conventional AAM facial representation is used. The highest recognition rates are obtained on the MMI database. This is explained by the fact that MMI has a better image resolution and less variation in illumination than many other datasets. The poorest results are obtained on databases which contain the strongest pose and illumination variations. These results serve mainly to confirm the relatively poor performance of conventional AAM.

TABLE AAM1

SUMMARY OF THE SYSTEM ACCURACIES (%) FOR RECOGNISING EMOTIONS WITH EUCLIDEAN-NN.

| Database | Recognition rate (%) |
|---|---|
| FEEDTUM | 35.71 |
| MMI | 40.88 |
| Our database | 22.66 |
| Overall | 33.08 |

Multi-Class SVM

By their nature SVMs are binary classifiers. However, there exist strategies by which SVMs can be adapted to multi-class tasks, such as One-Against-One (1A1), One-Against-All (1AA), Directed Acyclic Graph (DAG), and SVMs in cascade structures. In the following experiments we only exemplify the 1A1 and the cascade structures. The choice is based on their simplicity and their good results (see Wallhoff, F, "The Facial Expressions and Emotions Database Homepage (FEEDTUM)", www.mmk.ei.tum.de/waf/fgnet/feedtum.html. September 2005; and Wallhoff, F., et al. Efficient Recognition of authentic dynamic facial expressions on the FEEDTUM database. in IEEE International Conference on Multimedia and Expo. 9-12 Jul. 2006, each being incorporated by reference). The following experiments use the same test inputs as the NN tests presented in table AAM1.

For the first part of this experiment, we employed the 1A1 approach. Altogether 21 classifiers are applied for each picture in our test-bench. A general score is calculated for each picture. The "recognized" facial expression is considered to be the one which obtains the highest score. As an example, to calculate the score for a "happy face" we apply: happy/fear; happy/sad; happy/surprised; happy/neutral; happy/angry; and happy/disgusted. Every time that a happy face is identified, a counter is incremented that represents its score. Results are summarized in Table AAM2.

TABLE AAM2

EXPRESSION RECOGNITION ACCURACIES FOR 1AA-SVM ON THE FEEDTUM AND MMI DATABASES.

| Emotion | FEEDTUM (%) | MMI (%) |
|---|---|---|
| Surprise | 71 | 76.1 |
| Fear | 66.3 | 62.5 |
| Happiness | 65.4 | 62.5 |
| Anger | 64.8 | 56.8 |
| Neutral | 62.8 | 60.4 |
| Sadness | 61.5 | 59.7 |
| Disgust | 57.6 | 64 |
| Overall | 64.2 | 63.15 |

Figure 19A:
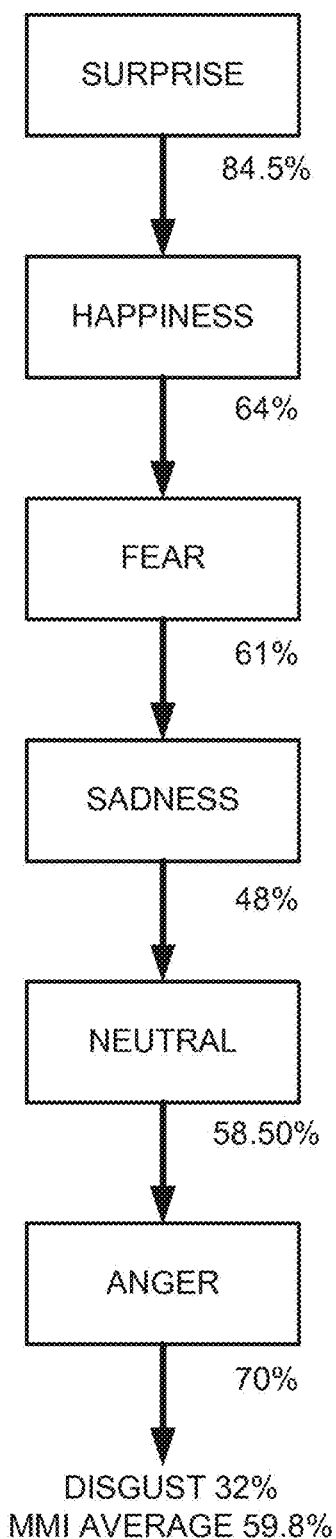
FIGS. 19a-19b illustrate performances of expression recognition of SVM classifiers in a cascade structure for MMI and FEEDTUM databases, and illustrate cascaded structures for each database including the most effective six classifiers of the seven which classify the six universal expressions, and the neutral expression, wherein the recognition rate is provided after each stage of the cascade.
Figure 19B:
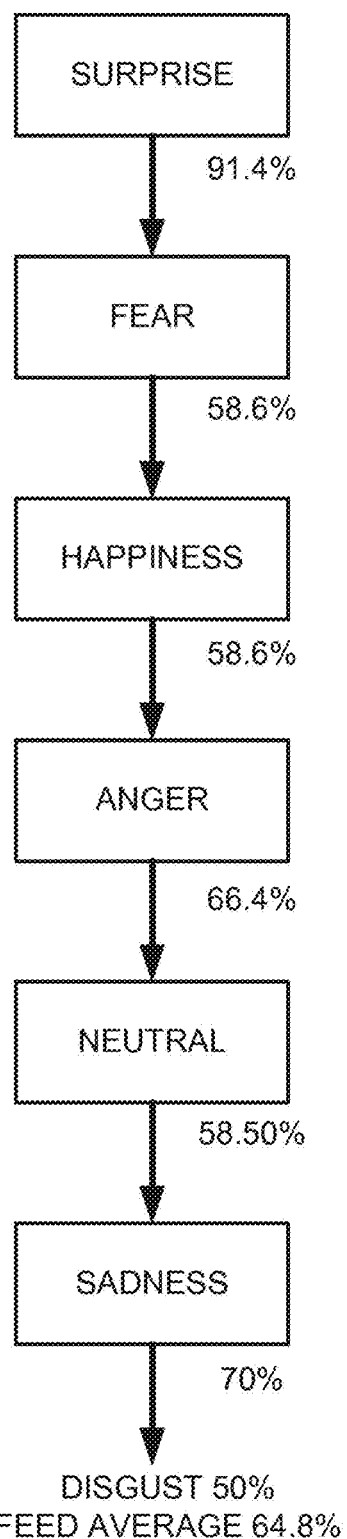

In the second part of the experiment, another alternative to extend the binary SVM to a multi-class SVM is investigated. A cascaded structure including the most effective six classifiers of the seven classifying the six universal expressions and the neutral expression are used. The workflow and the corresponding results are summarized in FIG. 19. Performances of expression recognition of SVM classifiers are provided in a cascade structure, for MMI and FEEDTUM databases on the left and right in FIG. 19, respectively. FIG. 19 illustrates the recognition rate after each stage of the cascade, e.g. our system correctly recognizes a surprised face with a probability of 84.5% or an angry face with a probability of 70%.

Conclusions on Classifier Performances

In this section, we analyzed approaches and corresponding results for expression classification and recognition in still images. Two classifiers, namely SVM and NN, were compared. After performing a series of five experiments, we conclude the following:

Overall, happiness proved to be the most recognizable expression, followed by surprise. These observations can be explained by the fact these particular expressions affect the shape of the facial features more than other expressions, e.g., note the open mouth and raised mouth corners. These expressions are followed in terms of recognizability by anger, sadness, disgust, neutral state, and fear.

The results prove system behaviour is consistent across subjects of both genders and several races and ages.

SVM is more effective than NN as a classifier, both with respect to higher classification/recognition rates and better consistency of the results Best results for SVM were obtained when using RBF kernel function with fixed on small values.

Best results for NN were obtained when using the Euclidean distance and a template obtained from averaging the shape parameters as a metric for classification. These settings are also to be used in our next series of experiments.

Results and Applications

FER Compared Across Different Modeling Strategies

Towards the end of the previous section we presented results for both NN and SVM FER using a conventional AAM model for feature extraction. The results of both approaches were quite disappointing. In this section we present a summary of detailed comparisons across different modeling strategies for both NN and SVM techniques.

TABLE NN-FINAL

SYSTEM ACCURACY (%) FOR CLASSIFYING FACIAL EXPRESSIONS USING EYE-AREA, MOUTH AREA, FACE MODELED WITH A CONVENTIONAL OR COMPONENT-BASED AAM, WITH EUCLIDEAN-NN

| Classifier | Eyes | Lips | Face | Comp |
|---|---|---|---|---|
| FEEDTUM | | | | |
| Surprised/Disg. (%) | 44.37 | 55.87 | 85.83 | 83.33 |
| Surprised/Happy (%) | 28.75 | 69.37 | 88.33 | 83.33 |
| Happy/Sad (%) | 41.87 | 46.25 | 68.33 | 82.22 |
| Surprised/Sad (%) | 33.12 | 51.66 | 93.33 | 83.33 |
| Overall (%) | 37.02 | 55.78 | 83.95 | 83.05 |
| MMI | | | | |
| Surprised/Disg. (%) | 73.12 | 76.66 | 85.62 | 78.33 |
| Surprised/Happy (%) | 68.75 | 75 | 86.25 | 79.16 |
| Happy/Sad (%) | 72.5 | 50 | 73.12 | 77.5 |
| Surprised/Sad (%) | 69.37 | 52.5 | 77 | 73.33 |
| Overall (%) | 70.93 | 63.54 | 80.49 | 77.08 |

The expression classification and recognition methods are tested on the specialized databases FEEDTUM and MMI, while their accuracy against pose variations is tested on pictures collected especially for this experiment. The results obtained from our tests, suggest that the system is robust in dealing with subjects of both genders. Also, it is independent of race and age.

Here the contributions of each of the AAM sub-models to expression analysis are evaluated. The results are compared with the results of a holistic AAM face model and a component-based AAM facial representation. Table NN-Final summarizes the classification results for a mouth model, two-eye model, a conventional AAM face model, and a component-based face AAM when using NN. In the corresponding Table SVM-Final we show corresponding results for the SVM classification scheme.

Comparison and Discussion of FER Results

The classification rate average when using a component-based AAM is of 73.02%, while for a classical AAM is of 69.43%. The results confirm the improvement brought by a sub-model representation although these are not quite as impressive as we would have felt from the initial improvements noted during our studies on the feature extraction and the classifiers for individual facial expressions. The SVM is quite good at compensating for the deficiencies of the conventional AAM and has reduced the benefits we would have expected from the use of our improved component-AAM approach.

TABLE SVM-FINAL

SYSTEM ACCURACIES (%) FOR SVM CLASSIFICATION OF EMOTIONS A CONVENTIONAL(1) AND COMPONENT-BASED(2) AAM.

| | A | | D | | F | | H | |
|---|---|---|---|---|---|---|---|---|
| | 1 | 2 | 1 | 2 | 1 | 2 | 1 | 2 |
| A | 70 | 75 | 63 | 75 | 70 | 75 | 66.7 | 68 |
| D | | | 79.4 | 73.4 | 63.4 | 70 | 70 | 75 |
| F | | | | | 72 | 70 | 66.7 | 73.4 |
| H | | | | | | | 92.7 | 93.4 |
| N | | | | | | | | |
| Sa | | | | | | | | |
| Su | | | | | | | | |

| | N | | Sa | | Su | |
|---|---|---|---|---|---|---|
| | 1 | 2 | 1 | 2 | 1 | 2 |
| A | 70 | 75 | 70 | 79.4 | 73.4 | 68.7 |
| D | 73.4 | 75 | 53.4 | 68 | 70 | 71.4 |
| F | 56.7 | 68.7 | 80 | 83.4 | 53.4 | 63 |
| H | 73.4 | 75 | 60 | 75 | 66.7 | 66.7 |
| N | 79.4 | 68.7 | 53.4 | 63 | 80 | 83.4 |
| Sa | | | 68.7 | 63.4 | 76.7 | 75 |
| Su | | | | | 71.4 | 73.4 |

Application to Computer Gaming Workflows

Our system demonstrates the real-time capability to determine a person's emotions. Such a system suggests a range of applications relevant to computer gaming environments, both single and multi-player.

Adaptation of Game Difficulty Based on User Emotions

Most computer games allow a user to select between a number of difficulty levels. Typically, this selection is made only once, at the beginning of a game and cannot be changed without starting a new instance of the game. A new game workflow is provided in accordance with certain embodiments where the emotions presented by a user via their facial expressions are evaluated in an ongoing basis and, where certain criteria are met, the difficulty level of a game will be adjusted upwards or downwards accordingly. In particular, the system in certain embodiments uses the angry, disgusted and sad face expressions as negative indicators suggesting that the current difficulty level is making the player unhappy. If a user continues in such negative states, then after a couple of minutes, the system can ease the difficulty level or provide some hints to achieving the next gameplay goal, or some other action to lift the spirits of the player, such as for example adjusting the foreground, background and/or characteristics of interactive objects like speed, intensity, potency of potential negative effect on the player, and/or adjusting the tone of audio or text and/or improving the performance of the subject. Contra-wise if the player is showing too much neutral face then it is determined in certain embodiments that the game has become too easy and they are bored. A happy face can be considered as an indicator of the correct level of difficulty as the user is still enjoying the game and presumably succeeding in realizing their objectives. These are just examples of ways to adjust game parameters based on recognized expressions on a player's face.

Adapting Game Workflow from User Responses

In addition to the basic determination of difficulty level based on facial expression recognition and/or recognized identity of the person's face and predetermined settings, we have also demonstrated a graded classification of several of these emotions in a real-time embodiment (see, e.g., Ioana Barcivarov, "Advances in the modeling of Facial Subregions and Facial Expression using Active Appearance Modeling Techniques", PhD Thesis, National University of Ireland Galway, June 2009, incorporated by reference). When combined, this enables not only the classification of these expressions but a measurement of the transition from a mild to a more intense expression. Such a metric provides interesting possibilities for adapting the more detailed workflow and storyline of a game.

In certain further embodiments, we take the use of facial expressions to the next level suggesting that the actual workflow and storyline of the gaming environment can be adapted according to the emotional state of the game player at critical waypoints or challenges along the game path. In conventional gaming, such alterations are only achieved based on the actual outcomes of a challenge in the game environment. Our techniques provide means for the game designer to achieve a richer and more detailed interaction with the players' states of mind before, during and immediately after critical junctures in the gaming storyline.

Real-Time Personalized Avatars

In a recent computer game, Little Big Planet, the game avatars associated with each player can be endowed with rudimentary facial expressions, e.g., pushing the up-arrow on the gamepad will generate a smiling face; a second press makes the expression even happier and a few more button-presses and your avatar will have a very silly grin throughout the game! Our concept is more challenging. In certain embodiments, dynamic detection of user facial expression is mirrored by their in-game avatar in real-time.

In a companion disclosure we describe an enhanced face model derived from active appearance model (AAM) techniques which employs a differential spatial subspace to provide an enhanced real-time depth map. Employing techniques from advanced AAM face model generation [31] and the information available from an enhanced depth map we can generate a real-time 3D face model. The next step, based on the 3D face model is to generate a 3D avatar that can mimic the face of a user in real time. We are currently exploring various approaches to implement such a system using our real-time stereoscopic imaging system.

While exemplary drawings and specific embodiments of the present invention have been described and illustrated, it is to be understood that that the scope of the present invention is not to be limited to the particular embodiments discussed. Thus, the embodiments shall be regarded as illustrative rather than restrictive, and it should be understood that variations may be made in those embodiments by workers skilled in the arts without departing from the scope of the present invention as set forth in the claims that follow and their structural and functional equivalents.

In addition, in methods that may be performed according to preferred and alternative embodiments and claims herein, the operations have been described in selected typographical sequences. However, the sequences have been selected and so ordered for typographical convenience and are not intended to imply any particular order for performing the operations, unless a particular ordering is expressly indicated as being required or is understood by those skilled in the art as being necessary.

Many references have been cited above herein, and in addition to that which is described as background, the invention summary, brief description of the drawings, the drawings and the abstract, these references are hereby incorporated by reference into the detailed description of the preferred embodiments, as disclosing alternative embodiments of elements or features of the embodiments not otherwise expressly set forth in detail above. In addition, the following are incorporated by reference as disclosing alternative embodiments: U.S. Pat. Nos. 7,565,030, 7,715,597, 7,515,740, and 7,620,218 and US published patent applications nos. 2009/0179998, 2010/0066822, 2008/0013798, 2008/0175481, 2009/0263022, 2009/0238419, 2009/0167893, 2009/0003661, 2009/0196466, 2009/0080713, 2009/0189998, 2009/0185753, 2009/0190803, 2009/0179999, 2007/0201724, 20070201725, 2010/0026833 and 2009/0303342, and U.S. patent application Ser. Nos. 12/374,040, 12/631,711, 61/182,625, 61/221,455 and 60/221,467.

What is claimed is:

1. A method for mirroring a user facial expression in an in-game avatar within a game display during a game, the method comprising:
    capturing a user facial expression in a digital image of a user's face as the user participates in the game;
    based on content of the image, determining the user facial expression by extracting one or more features of the user's face from the digital image, including one or two eyes or a subset of features of the one or two eyes, or one or two lips by:
    (i) extracting the one or more features of the user's face using a first method;
    (ii) extracting the one of more features of the user's face using a second method; and
    (ii) comparing a first calculated error of the first method and a second calculated error of the second method and using the extracted one or more features produced by the first method if the first calculated error is lower than the second calculated error;
    applying a model, which includes multiple shape parameters to determine one or more similarities between the one or more facial features and one or more reference features, using a Nearest Neighbor classification method or a Support Vector Machines classification method;
    based on the one or more similarities determined with the model, identifying a probable expression of the user's face; and
    causing the in-game avatar to mimic the probable expression of the user's face in the game display.

2. The method of claim 1, wherein the one or more features of the user's face extracted from the digital image include one or more skin texture appearance changes comprising one or more furrows, bulges, expression wrinkles, or illumination variations or a blushing; or multiple pose variations and multiple directional illumination conditions.

3. The method of claim 1, further comprising categorizing the user facial expression as indicating one or more of: surprise, fear, happiness, anger, neutral, sadness, disgust.

4. The method of claim 1, wherein the first method includes a component Active Appearance Model.

5. The method of claim 1, wherein some of the features are extracted using at least a first eye sub-model and a second eye sub-model.

6. The method of claim 5, wherein a common eye sub-model is fitted into at least one of the first eye sub-model and the second eye sub-model.

7. The method of claim 1, wherein the model includes an 3D face model.

8. The method of claim 7, wherein the in-game avatar includes a 3D face.

9. The method of claim 1, wherein a position and a shape of each of the two eyes are independently modeled.

10. A non-transitory computer-readable storage medium, storing one or more computer instructions which, when executed by one or more processors, cause the processors to perform:

generating an in-game avatar and displaying the in-game avatar within a game display during a game;

capturing a user facial expression in a digital image of a user's face as the user participates in the game;

based on content of the image, determining the user facial expression by extracting one or more features of the user's face from the digital image, including one or two eyes or a subset of features of the one or two eyes, or one or two lips by:

(i) extracting the one or more features of the user's face using a first method;

(ii) extracting the one of more features of the user's face using a second method; and (ii) comparing a first calculated error of the first method and a second calculated error of the second method and using the extracted one or more features produced by the first method if the first calculated error is lower than the second calculated error;

applying a model which includes multiple shape parameters to determine one or more similarities between the one or more facial features and one or more reference features, using a Nearest Neighbor classification method or a Support Vector Machines classification method;

based on the one or more similarities determined with the model, identifying a probable expression of the user's face; and causing the in-game avatar to mimic the probable expression of the user's face in the game display.

11. The non-transitory computer-readable storage medium of claim 10, wherein the one or more features depicted in the image of the user's face extracted from the digital image include one or more skin texture appearance changes comprising one or more furrows, bulges, expression wrinkles, or illumination variations or a blushing; or multiple pose variations and multiple directional illumination conditions.

12. The non-transitory computer-readable storage medium of claim 10, further comprising instructions for categorizing the user facial expression as indicating one or more of:

surprise, fear, happiness, anger, neutral, sadness, disgust.

13. An apparatus for mirroring a user facial expression in an in-game avatar, the apparatus comprising:
a user facial expression detection unit configured to:
capture a user facial expression in a digital image of a user's face as the user participates in a game;
based on content of the image, determine a user facial expression by extracting one or more features of the user's face from the digital image, including one or two eyes or a subset of features of the one or two eyes, or one or two lips by:
(i) extracting the one or more features of the user's face using a first method;
(ii) extracting the one of more features of the user's face using a second method; and
(iii) comparing a first calculated error of the first method and a second calculated error of the second method and using the extracted one or more features produced by the first method if the first calculated error is lower than the second calculated error;
apply a model which includes multiple shape parameters to determine one or more similarities between the one or more facial features and one or more reference features, using a Nearest Neighbor classification method or a Support Vector Machines classification method;
based on the one or more similarities determined with the model, identify a probable expression of the user's face; and
cause the in-game avatar to mimic the probable expression of the user's face in a game display.

14. The apparatus for mirroring a user facial expression of claim 13, wherein the one or more features of the user's face extracted from the digital image include one or more skin texture appearance changes comprising one or more furrows, bulges, expression wrinkles, or illumination variations or a blushing.

15. The apparatus for mirroring a user facial expression of claim 13, wherein the determining of the user facial expression is based, at least in part, on one or more of:
multiple pose variations, or multiple directional illumination conditions.

16. The apparatus for mirroring a user facial expression of claim 13, wherein the user facial expression detection unit is further configured to:
determine one or more facial expressions taken from the group consisting of an appearance of surprise, fear, happiness, anger, neutral disposition, sadness, and disgust.

17. The apparatus for mirroring a user facial expression of claim 13, wherein the user facial expression detection unit is further configured to: categorize the user facial expression as indicating one or more of: surprise, fear, happiness, anger, neutral, sadness, disgust.

18. The apparatus for mirroring a user facial expression of claim 13, wherein the user facial expression detection unit is further configured to: adapt a difficulty of the game based on the user facial expression.

* * * * *